(12) United States Patent
Barak et al.

(10) Patent No.: US 7,490,844 B2
(45) Date of Patent: Feb. 17, 2009

(54) CONVERTIBLE CYCLING APPARATUS

(75) Inventors: Shlomo Barak, Rishoo-Lezion (IL); Hagai Barak, Tel-Aviv (IL); Amit Barak, Tel-Aviv (IL); Miky Heimann, Lapid (IL)

(73) Assignee: Taga Design & Development Ltd., Tel Aviv (IL)

( * ) Notice: Subject to any disclaimer, the term of this patent is extended or adjusted under 35 U.S.C. 154(b) by 479 days.

(21) Appl. No.: 11/224,114

(22) Filed: Sep. 13, 2005

(65) Prior Publication Data
US 2007/0057483 A1 Mar. 15, 2007

(51) Int. Cl.
*B62K 13/00* (2006.01)
(52) U.S. Cl. .............. 280/287; 280/278; 280/7.17; 280/288.4; 280/643
(58) Field of Classification Search .............. 280/288.4, 280/282, 292, 304.5, 31, 7.15, 7.17, 1.188, 280/1.186, 1.23, 642, 643, 648, 658, 287, 280/278
See application file for complete search history.

(56) References Cited
U.S. PATENT DOCUMENTS

| | | | | | |
|---|---|---|---|---|---|
| 4,767,130 | A | * | 8/1988 | Fu-Chao | 280/202 |
| 4,789,175 | A | * | 12/1988 | Schramm | 280/304.1 |
| 4,863,193 | A | * | 9/1989 | Keshani | 283/2 |
| 4,917,396 | A | * | 4/1990 | Meneses et al. | 280/267 |
| 4,966,381 | A | * | 10/1990 | Feikema | 280/261 |
| 5,193,831 | A | * | 3/1993 | Capitoli | 280/202 |
| 5,692,760 | A | * | 12/1997 | Pickering | 280/7.17 |
| 5,788,254 | A | * | 8/1998 | Davis | 280/282 |
| 5,863,058 | A | * | 1/1999 | Jinks | 280/202 |
| 5,884,922 | A | | 3/1999 | Pickering | |
| 6,443,469 | B1 | * | 9/2002 | Cross et al. | 280/47.4 |
| 7,004,272 | B1 | * | 2/2006 | Brown et al. | 180/65.1 |
| 7,249,779 | B2 | * | 7/2007 | Ehrenreich et al. | 280/643 |
| 2004/0245745 | A1 | * | 12/2004 | Vasser | 280/282 |

FOREIGN PATENT DOCUMENTS

| | | |
|---|---|---|
| GB | 632449 | 11/1949 |
| JP | 2005088606 | 4/2005 |
| JP | 2005119450 | 5/2005 |
| SU | 1204463 | 1/1986 |

* cited by examiner

Primary Examiner—Tony H. Winner
(74) Attorney, Agent, or Firm—Dekel Patent Ltd.; David Klein

(57) ABSTRACT

Cycling apparatus including at least one front wheel and at least one rear wheel rotatably mounted on axles on a frame, a riding seat attached to the frame, a drive mechanism coupled to at least one of the wheels for driving the cycling apparatus, at least one handlebar post attached to a portion of the frame, and a carrier member attachable to the frame for carrying at least one of a child and an object therein and movable between first and second attachment orientations, wherein in the first attachment orientation the cycling apparatus is in a rider-powered orientation drivable by a rider sitting on the seat and powering the drive mechanism, and wherein in the second attachment orientation the cycling apparatus is in a stroller orientation wherein the at least one handlebar post is arranged with respect to the carrier member to form a pushable stroller, wherein a center of gravity of the carrier member with respect to the axle of the at least one front wheel at the first attachment orientation is different than at the second attachment orientation.

12 Claims, 25 Drawing Sheets

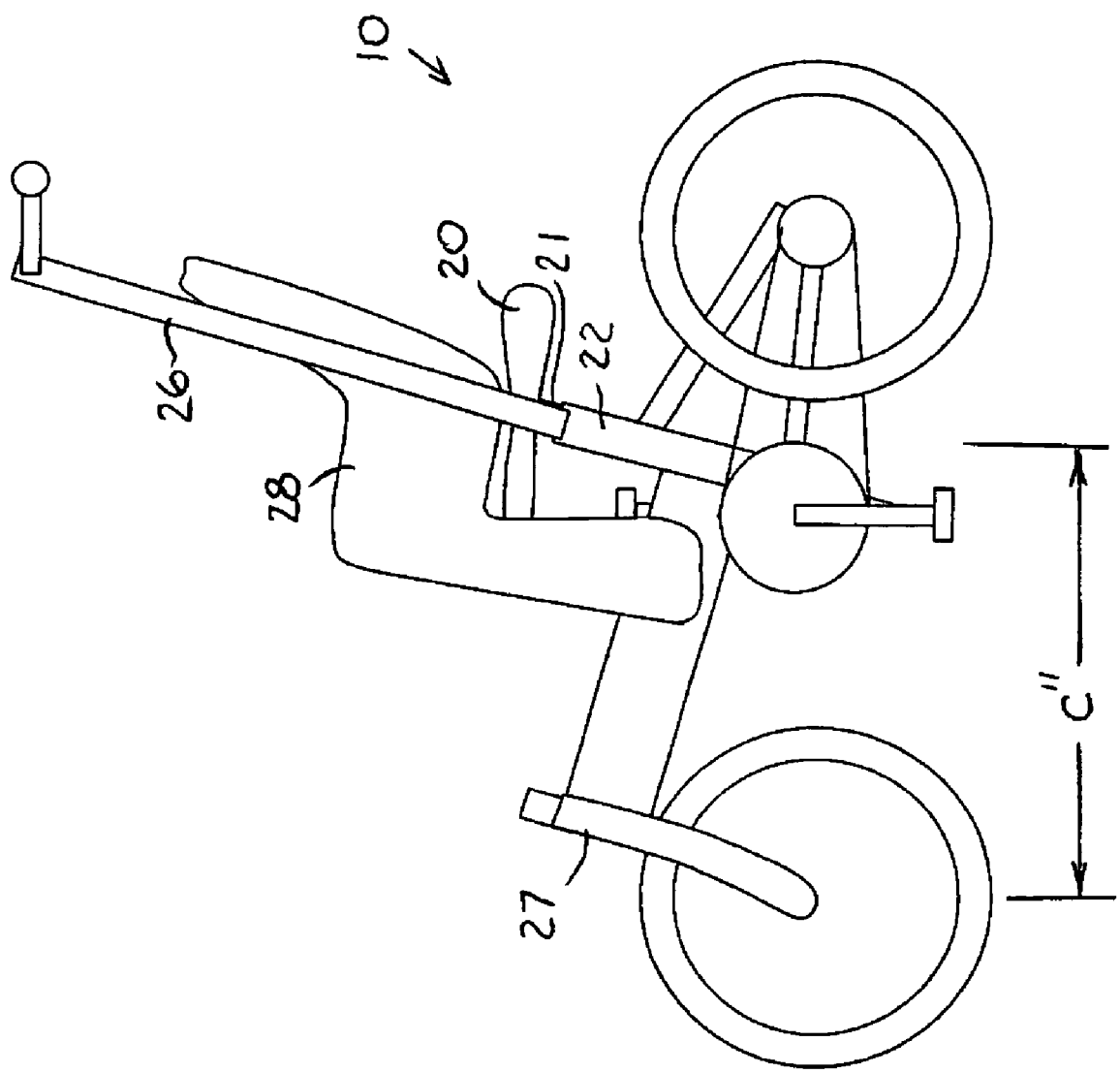

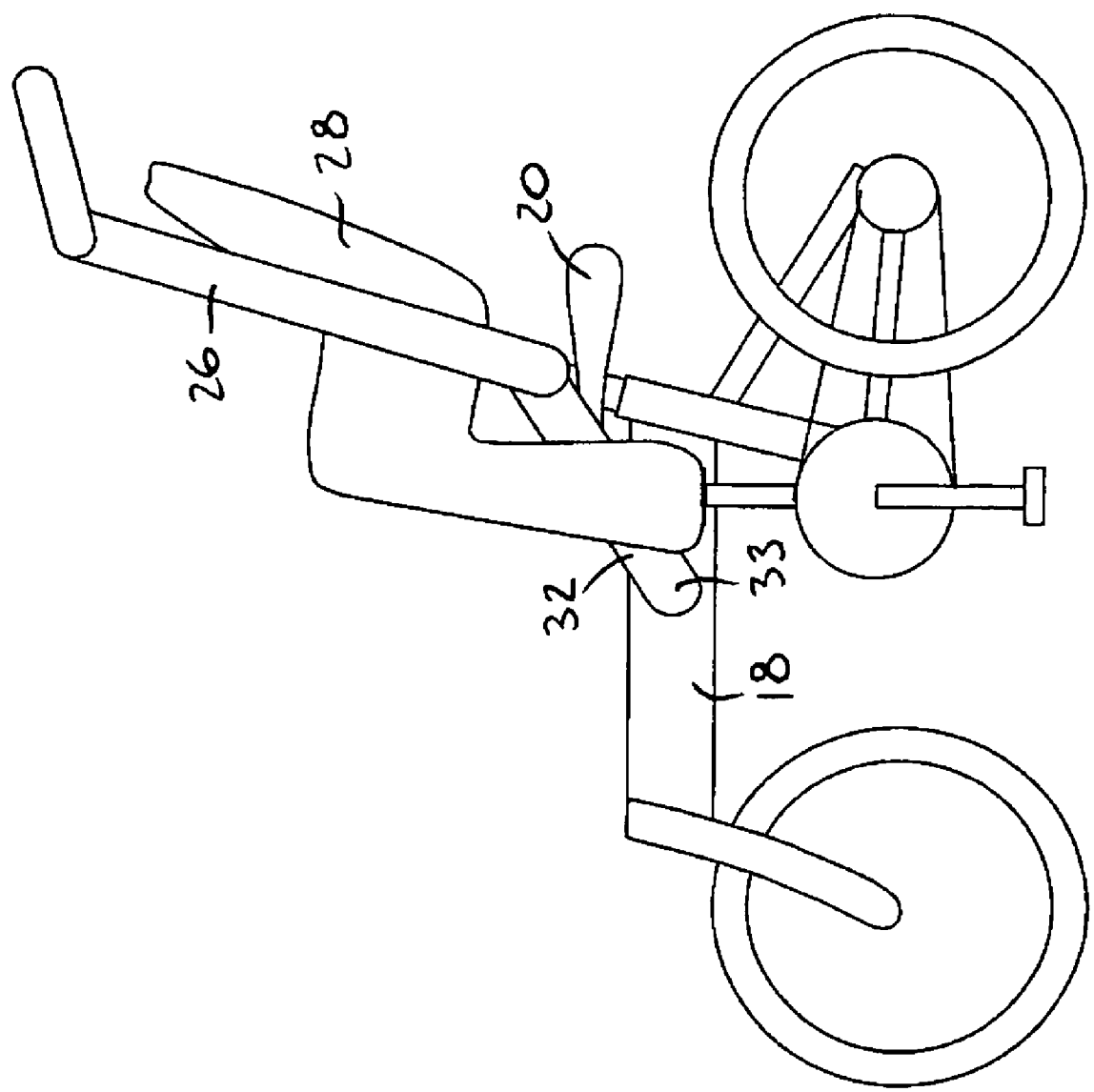

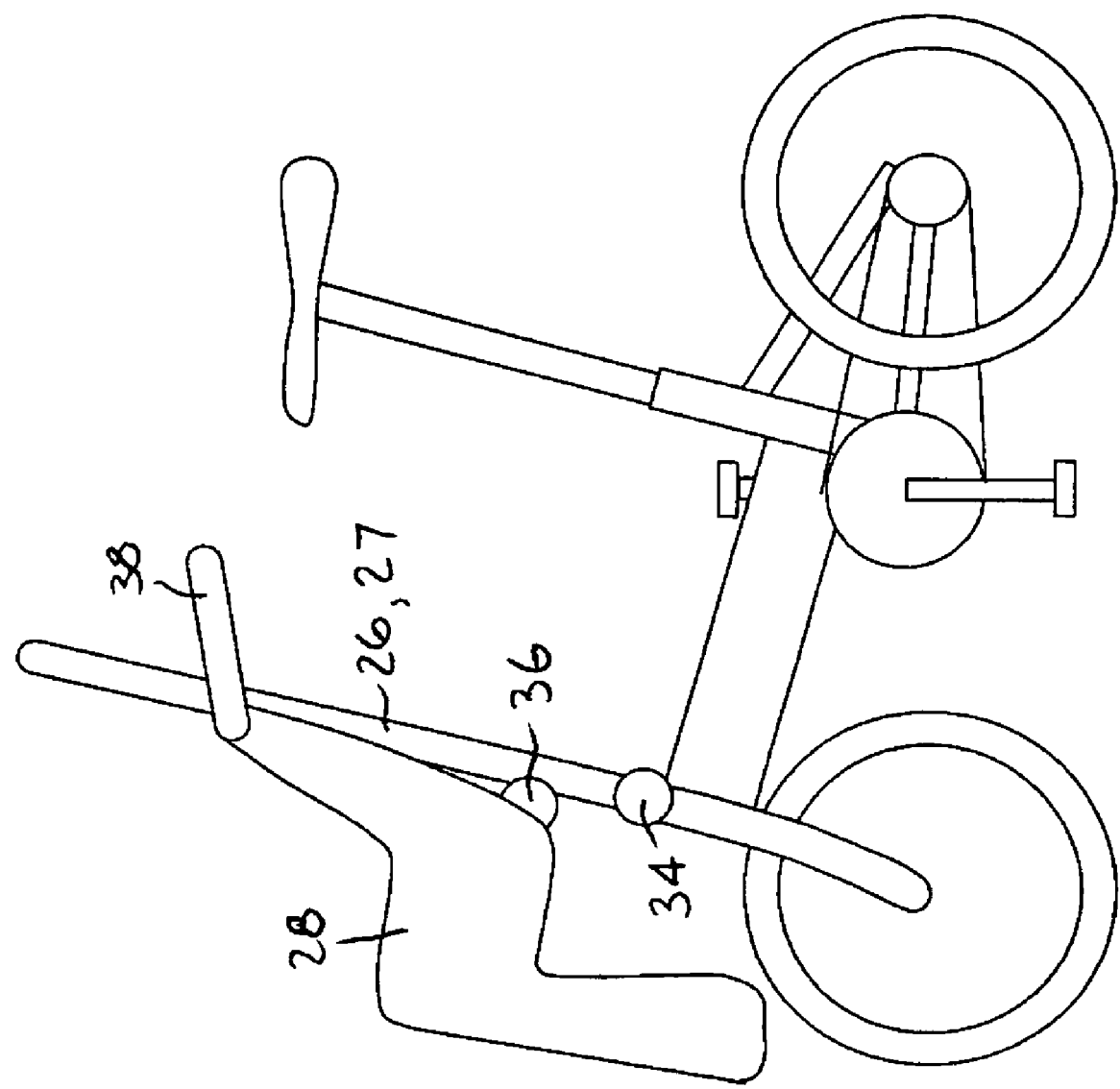

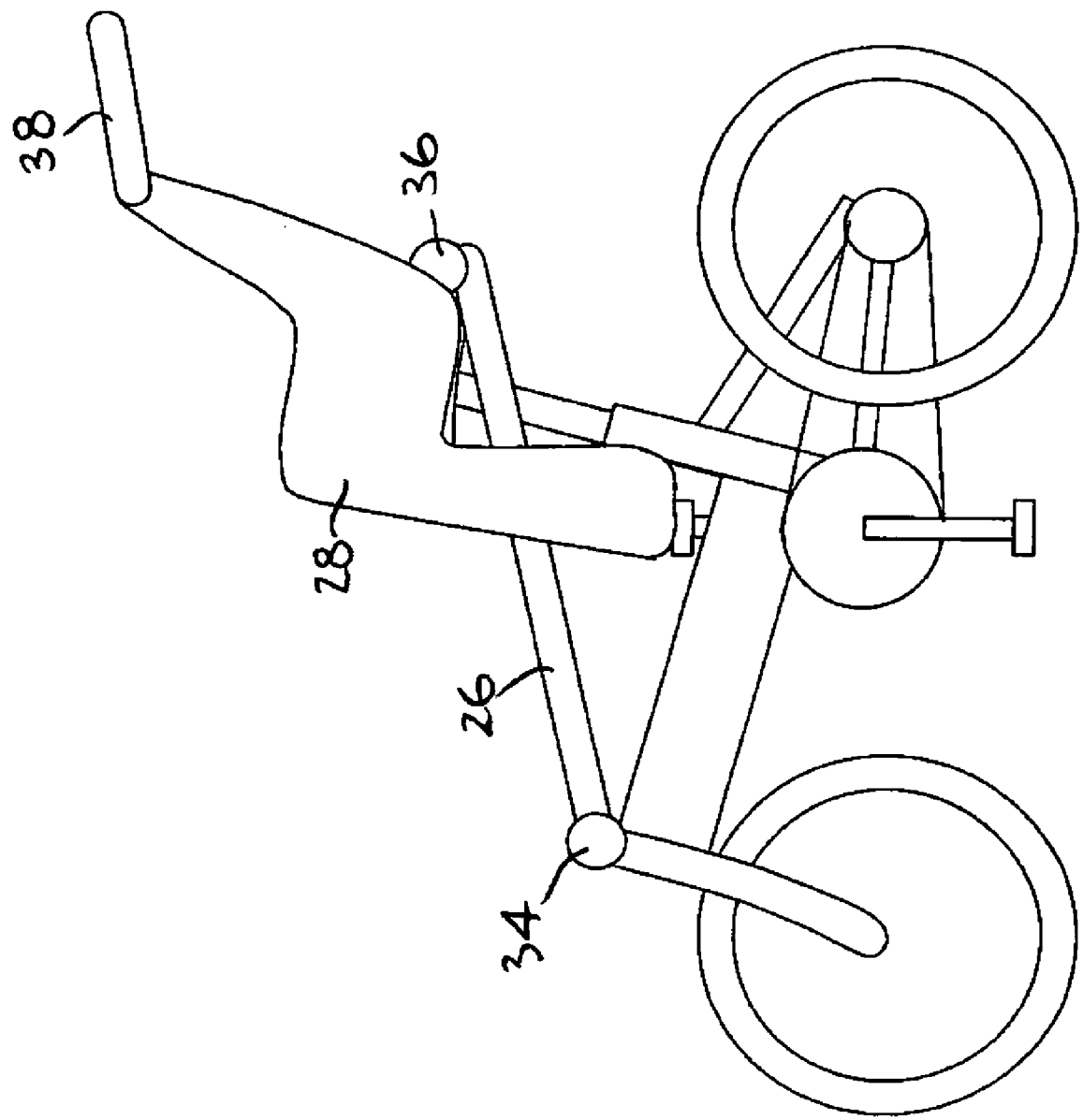

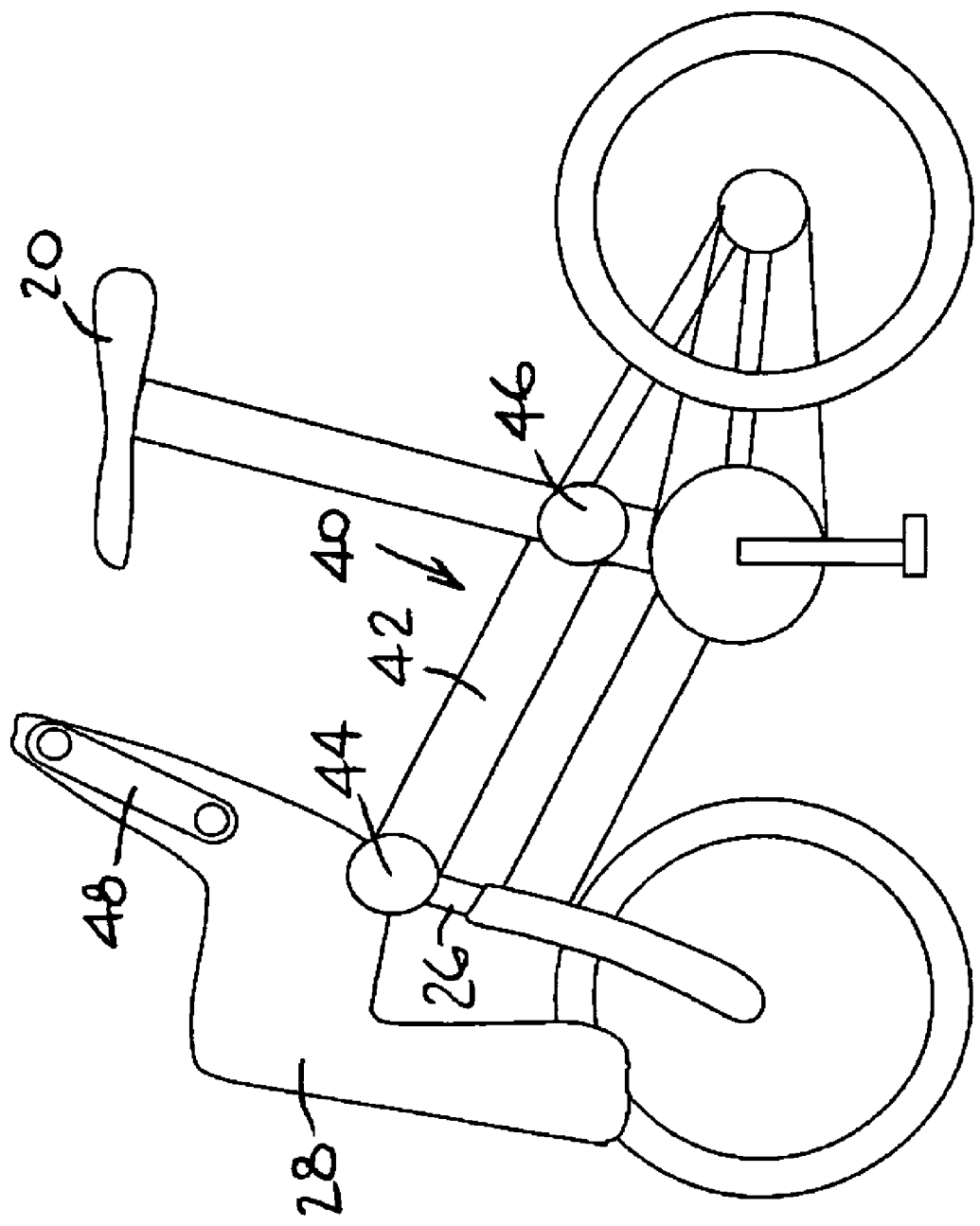

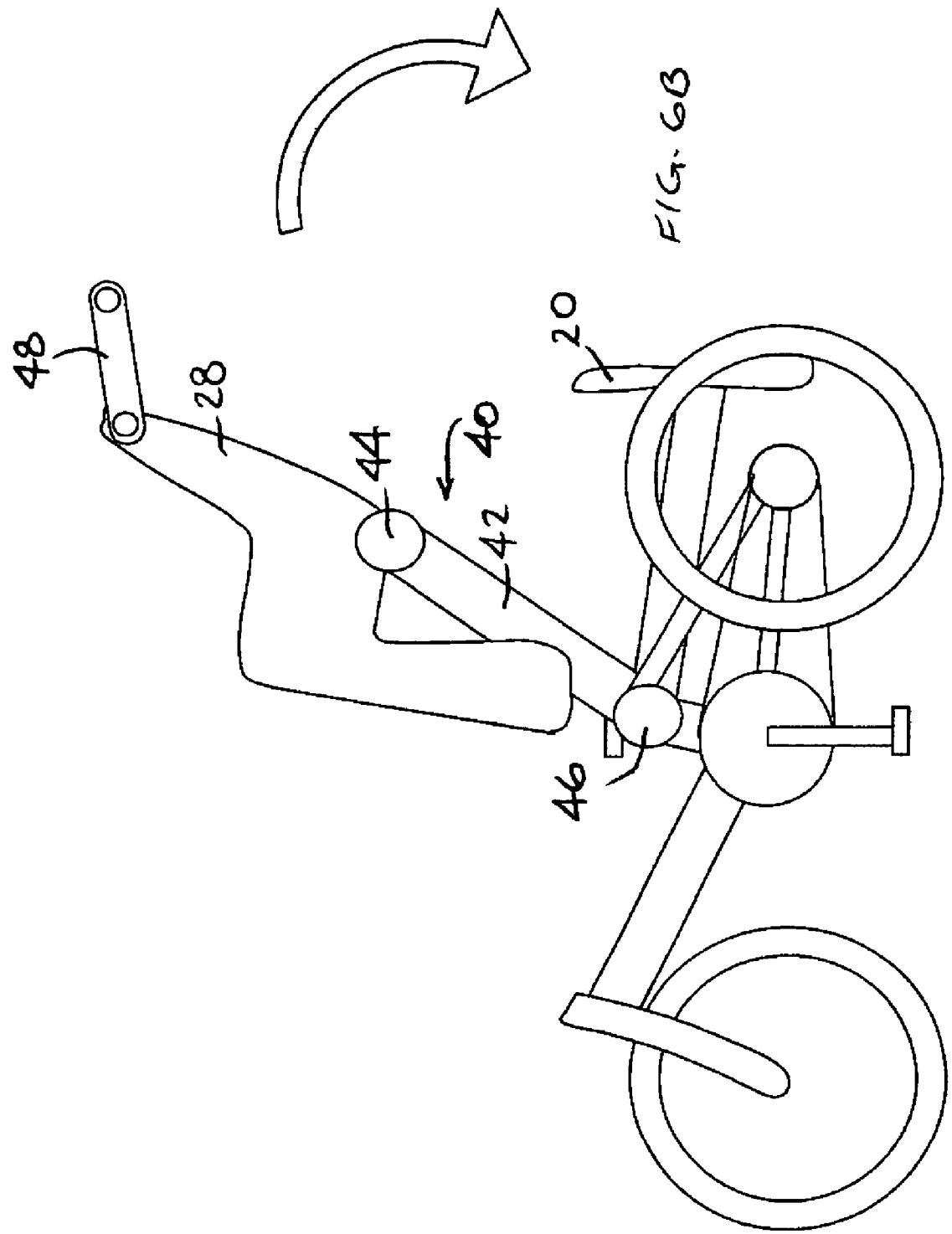

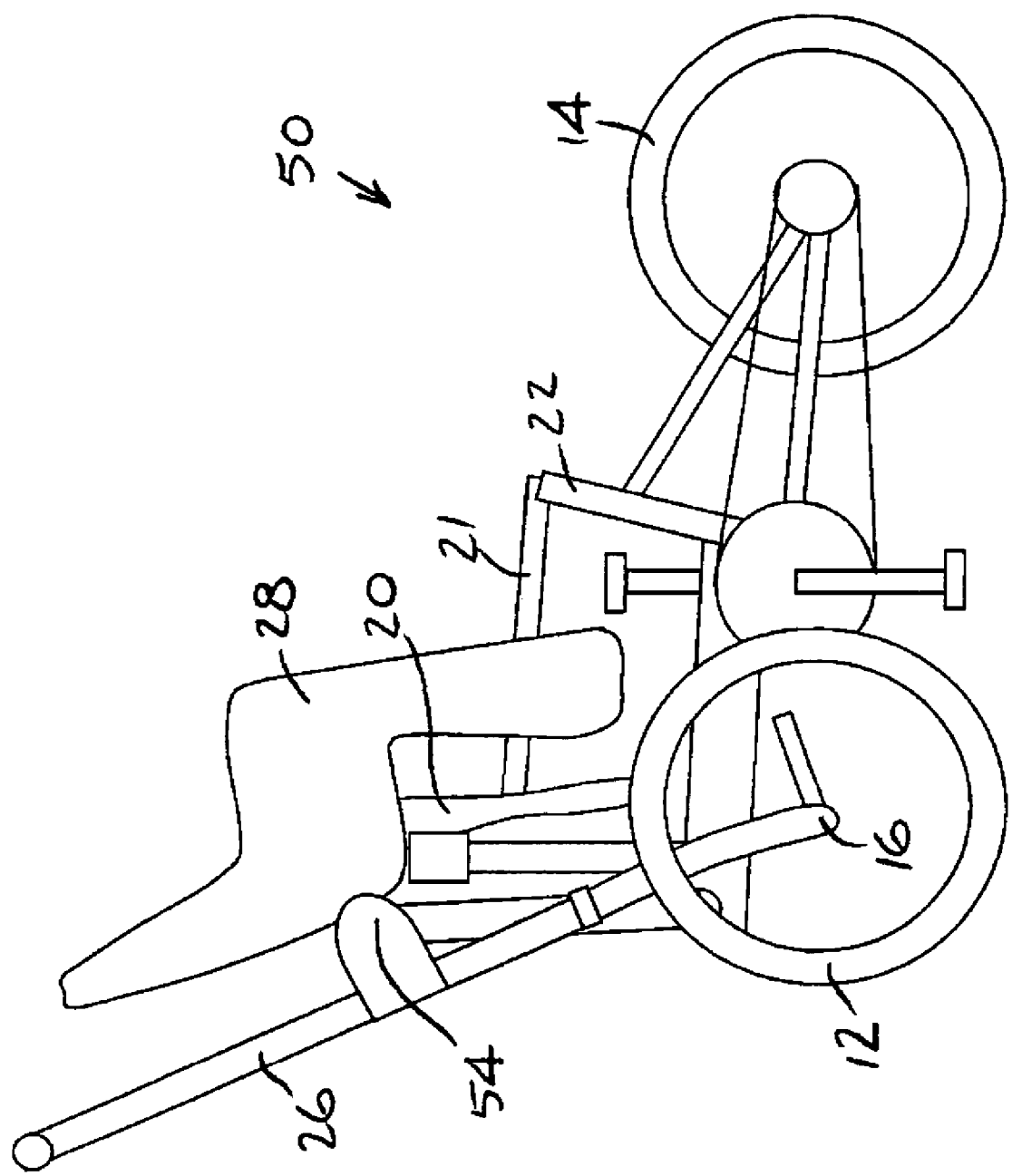

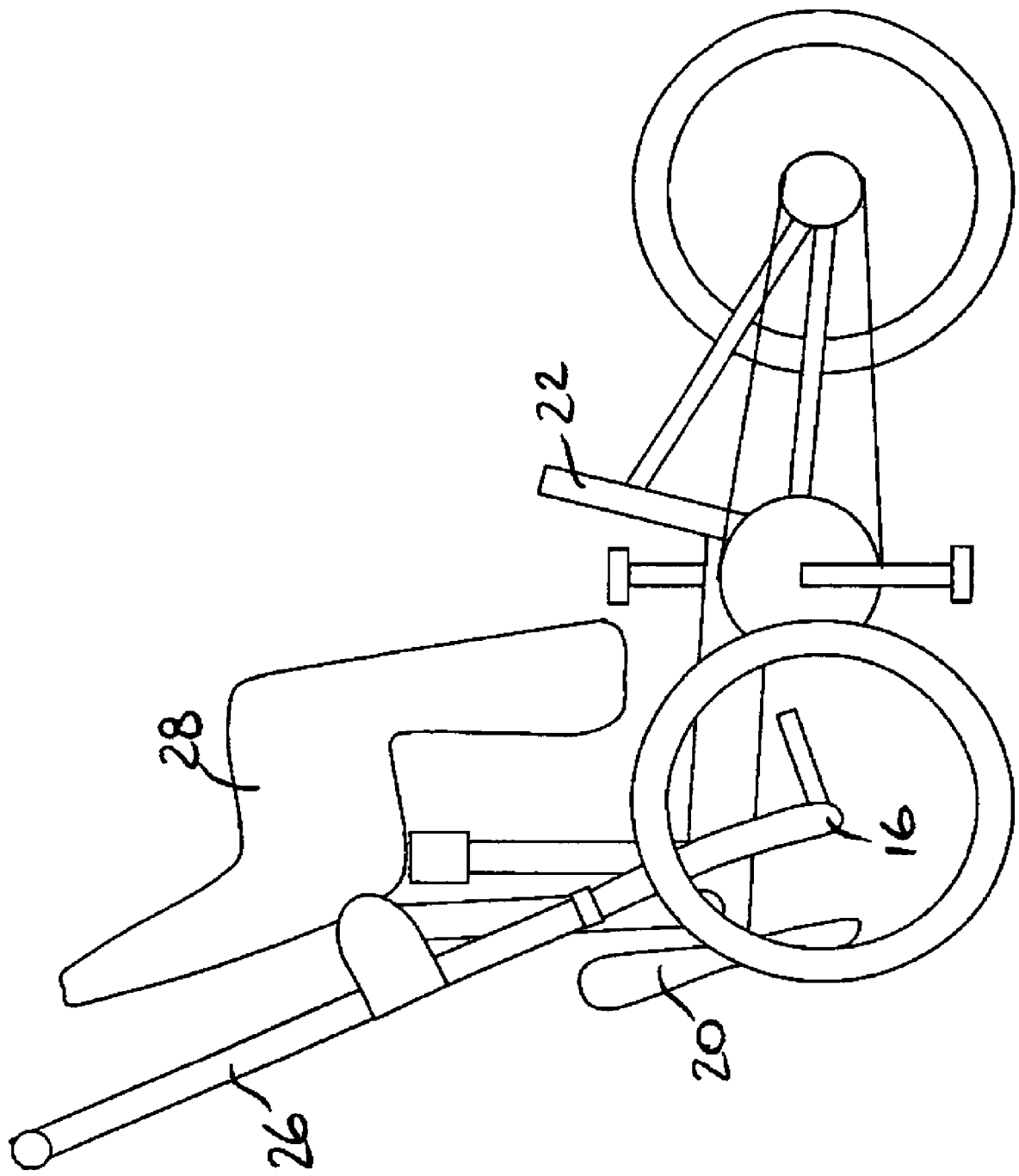

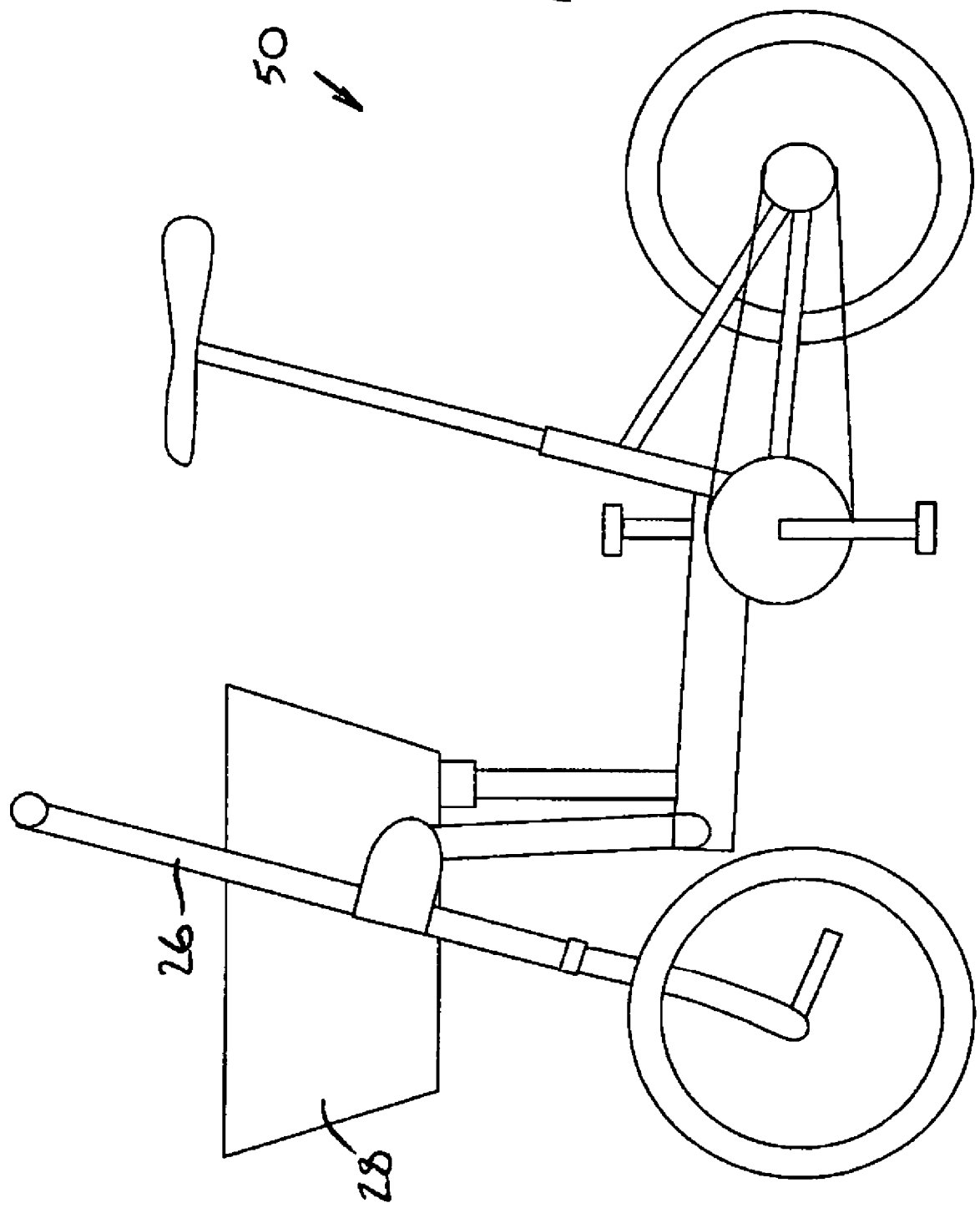

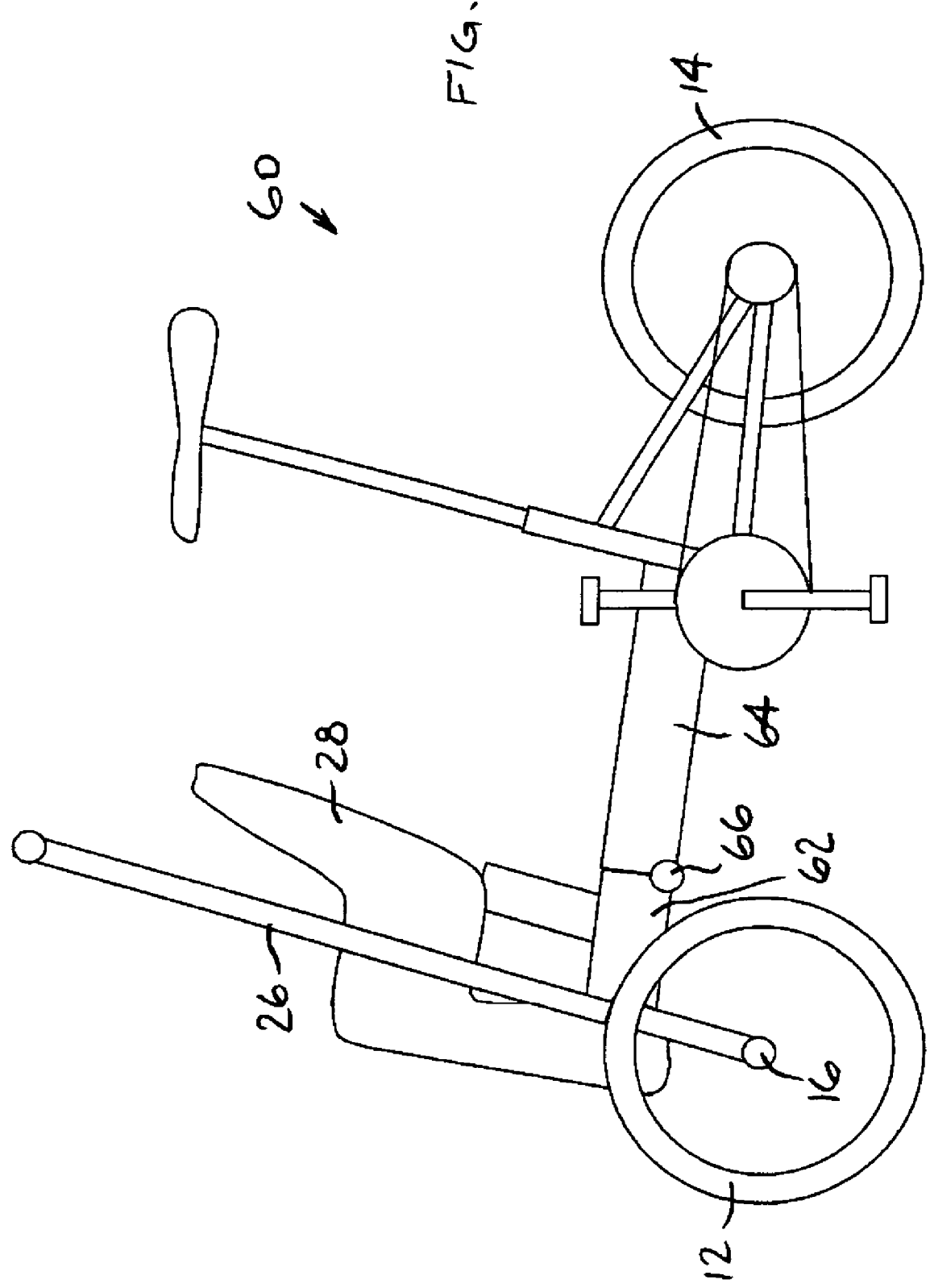

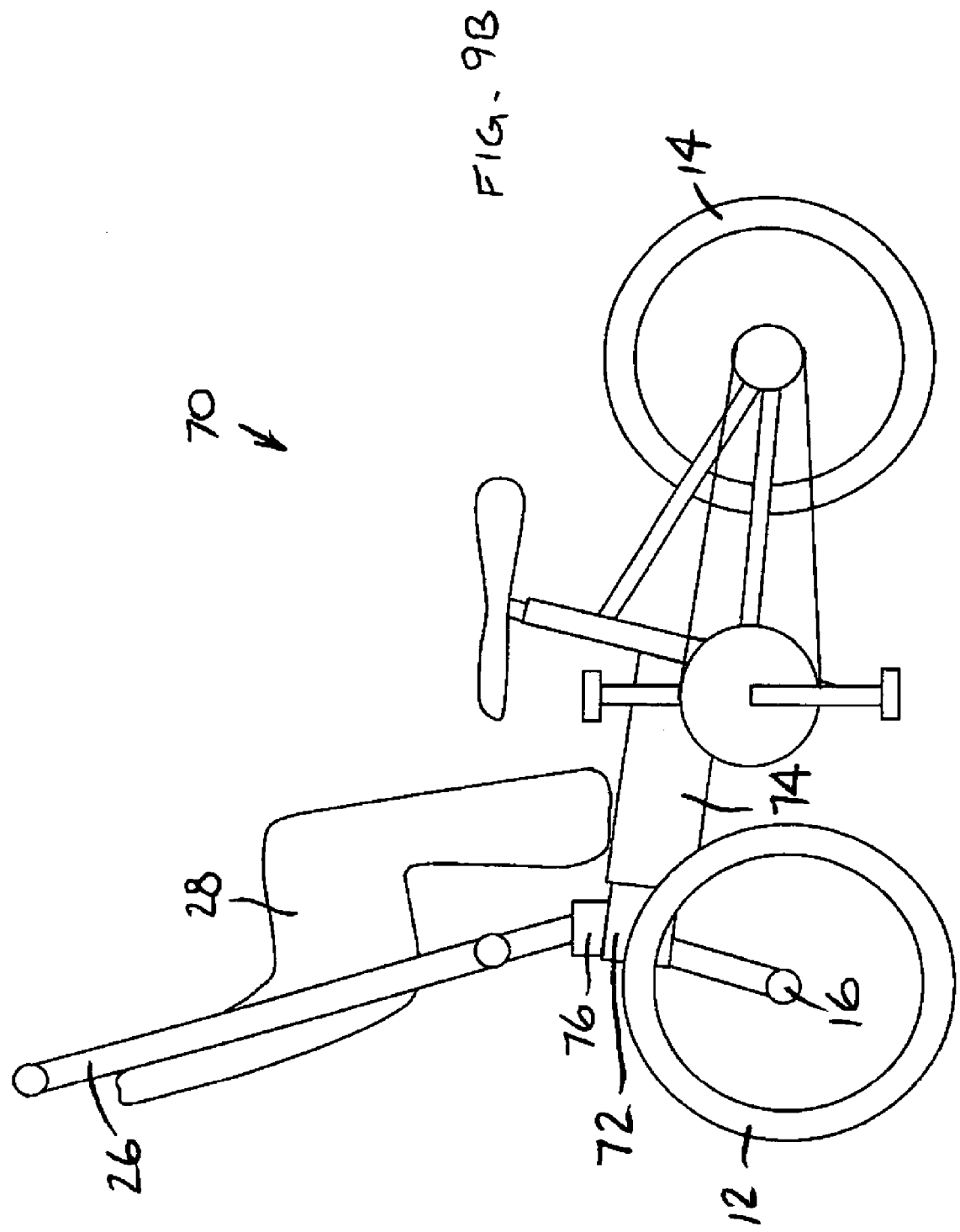

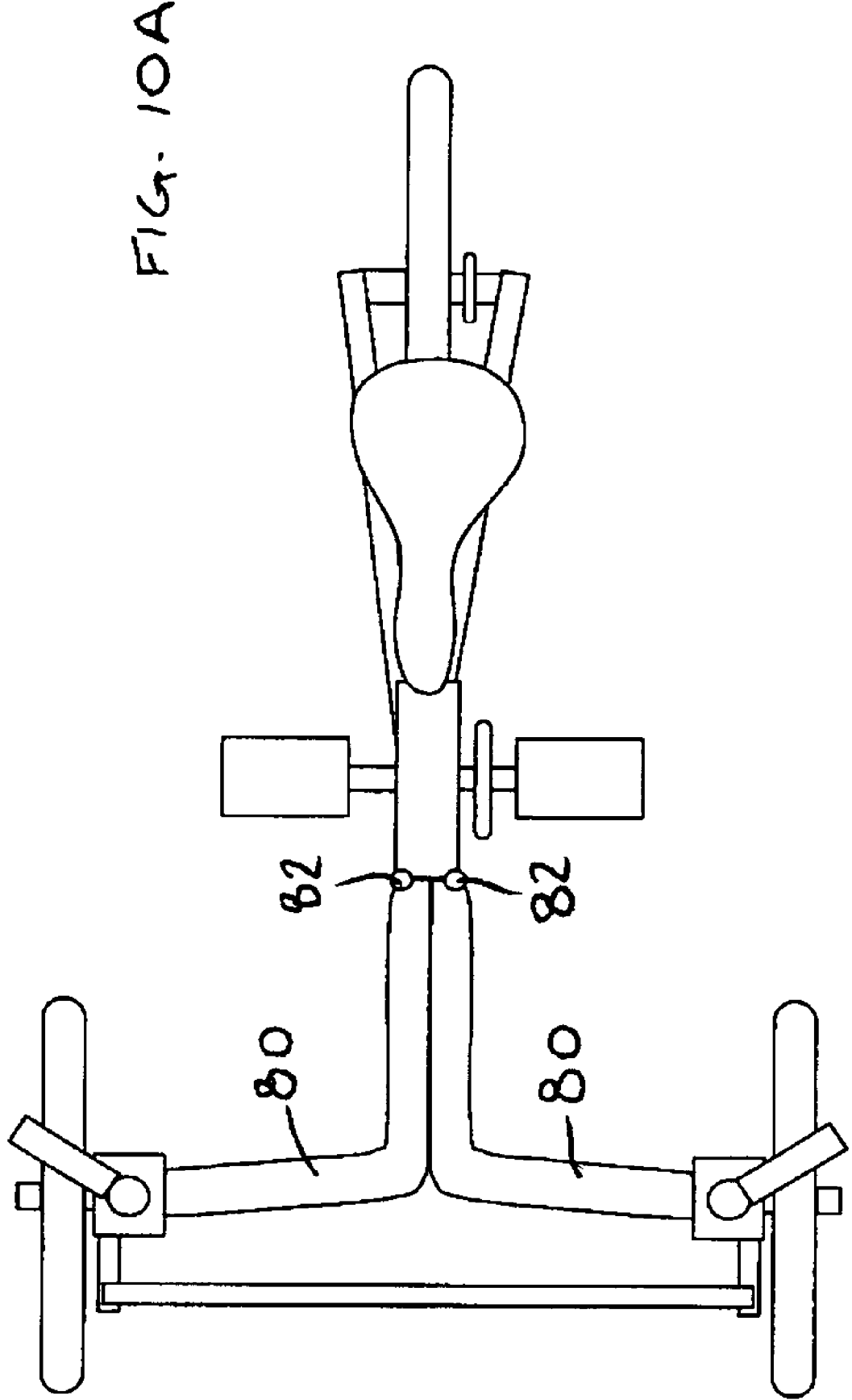

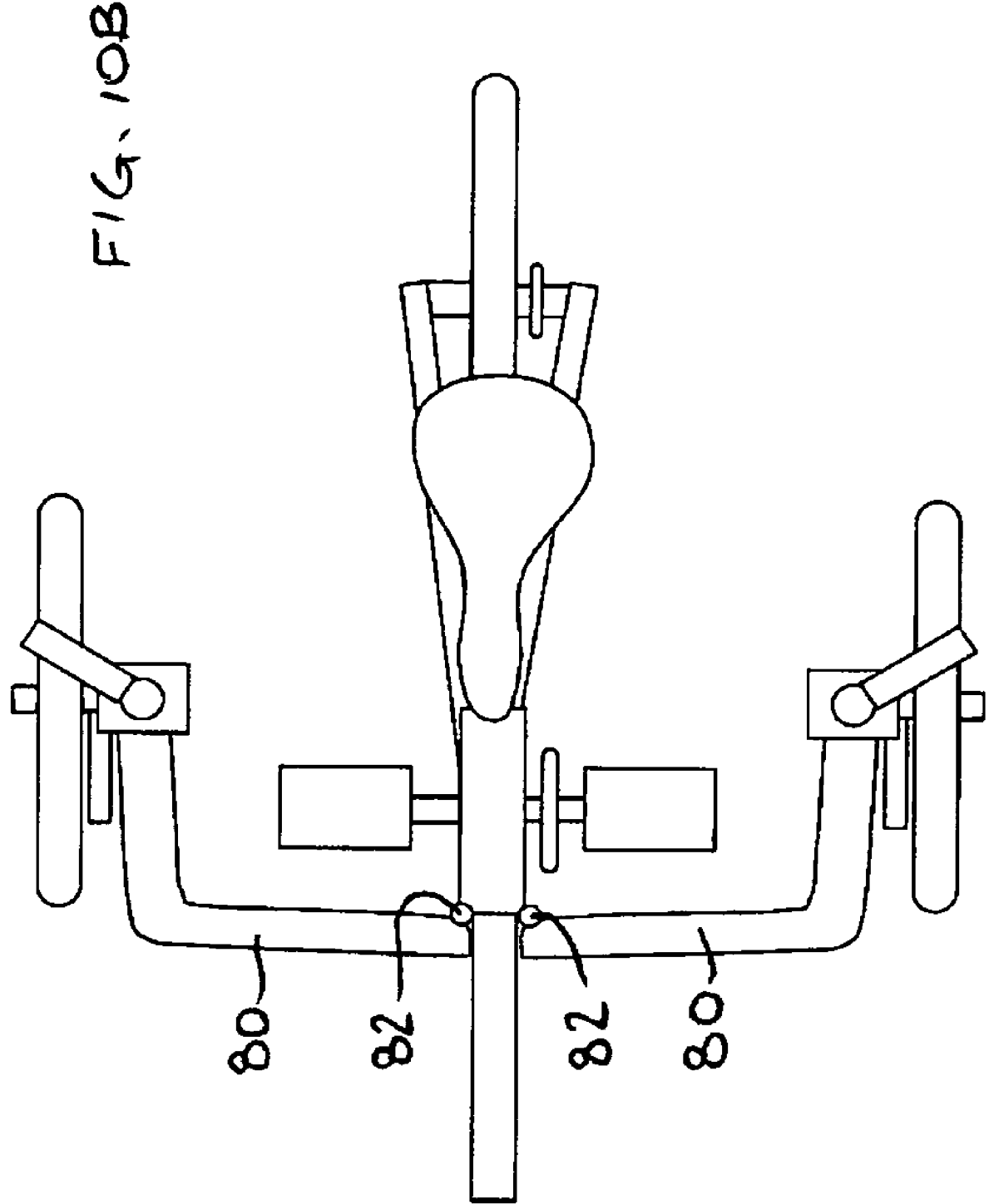

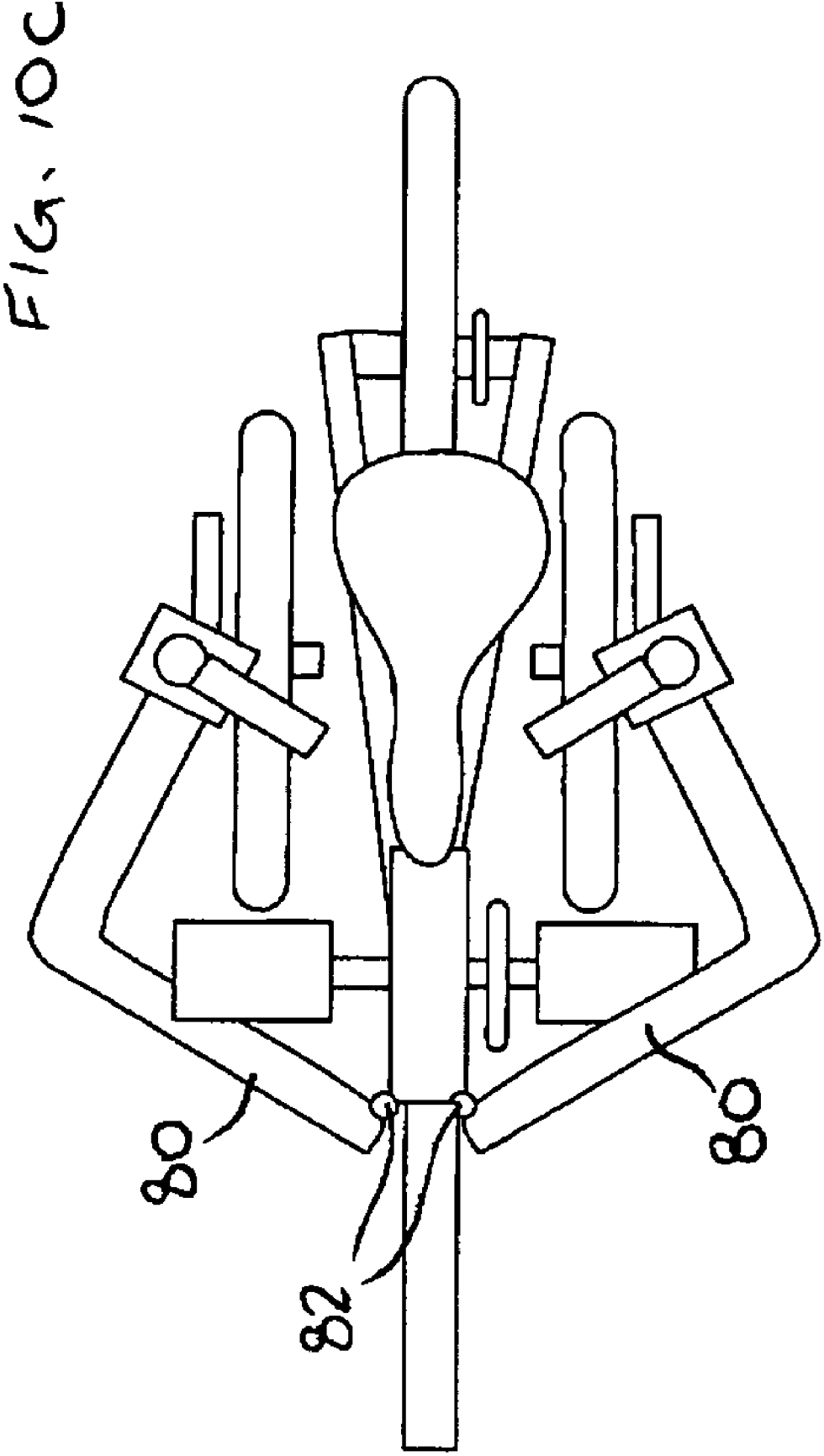

CONVERTIBLE CYCLING APPARATUS

FIELD OF THE INVENTION

The present invention relates generally to cycling apparatus, e.g., bicycles and tricycles, and particularly to cycling apparatus that converts into a child stroller or shopping cart.

BACKGROUND OF THE INVENTION

Many types of human-powered tricycles are known. The main advantages of tricycles over a standard bicycle are stability and safety: the fact that there are three wheels in a tricycle, instead of two, enables the rider to load extra weight on the tricycle, such as small children or shopping bags, and to maintain the child or the bags on the tricycle without risk of falling, even when the tricycle is at a full stop.

A major problem with available types of tricycles, as carrying vehicles, is their large size and structure, making them difficult and sometimes forbidden to use in indoor places and in small and crowded places such as shops, supermarkets, malls, coffee bars, elevators, buses, trains and even busy street pavements and small apartments.

Japanese Patent Document JP2005088606 describes a folding tricycle, which may transport a load or a child thereon, and can be used as a cart for a load or a buggy in a folded state. The folding tricycle has two front wheels and one rear wheel in order to improve the stability in a traveling mode. A mounting base capable of mounting a load or a child is provided between the two front wheels. When folded, the tricycle has a shortened wheel base for use as a cart or buggy.

SUMMARY OF THE INVENTION

The present invention seeks to provide an improved cycling apparatus that may be converted into a stroller, as is described in detail further hereinbelow. In one non-limiting embodiment of the invention, the cycling apparatus is constructed as a tricycle with a contractible and extendable wheel base, which can carry a child and/or a shopping basket, and which can be converted into a standard-size stroller or a standard-size shopping cart, and be steered like a standard stroller or a standard shopping cart. The cycling apparatus can also be folded for transportation in a standard-size car trunk or storage in a box or closet.

This convertible tricycle can be used in many situations. For example, a parent can drive the tricycle from home to a shopping mall with a child. Upon reaching the mall, the tricycle can be converted to a stroller in less than one minute and the parent can enter the building while pushing the stroller, without being required to leave the tricycle outside (a situation that usually happens with a bicycle or regular tricycle). In a supermarket, a person can use the shopping cart to collect the groceries, leave the shop, convert the cart into a tricycle and ride back home with the groceries.

There is thus provided in accordance with an embodiment of the present invention cycling apparatus at least one front wheel and at least one rear wheel rotatably mounted on axles on a frame, a riding seat attached to the frame, a drive mechanism coupled to at least one of the wheels for driving the cycling apparatus, at least one handlebar post attached to a portion of the frame, and a carrier member attachable to the frame for carrying at least one of a child and an object therein and movable between first and second attachment orientations, wherein in the first attachment orientation the cycling apparatus is in a rider-powered orientation drivable by a rider sitting on the seat and powering the drive mechanism, and wherein in the second attachment orientation the cycling apparatus is in a stroller orientation wherein the at least one handlebar post is arranged with respect to the carrier member to form a pushable stroller, wherein a center of gravity of the carrier member with respect to the axle of the at least one front wheel at the first attachment orientation is different than at the second attachment orientation.

The cycling apparatus can include one or more of the following features. For example, the handlebar post may spatially translate and/or change its rotational orientation about the axle between the first and second attachment orientations. A distance between the front and rear wheels may change between the first and second attachment orientations. The carrier member may face in a first direction when the cycling apparatus is in the rider-powered orientation, and face in a second direction opposite to the first direction when the cycling apparatus is in the stroller orientation.

The seat may be upright when the cycling apparatus is in the rider-powered orientation and may be folded downwards when the cycling apparatus is in the stroller orientation.

The seat may be attached to a post slidingly mounted in a tube, wherein the post extends further out of the tube in the rider-powered orientation than in the stroller orientation.

The handlebar post may include two individual mounting posts separated by a space, wherein at least a portion of the carrier member is disposed in the space between the mounting posts. In the first attachment orientation, the handlebars may be tilted away from an upright position toward the seat, and in the second attachment orientation the handlebars may be tilted away from the upright position and away from the seat. The handlebar post may be telescopically extendable.

An adjustment assembly may be coupled to the handlebar post for moving the handlebar post between the first and second attachment orientations. The handlebar post may be rotatable about the axle of one of the wheels between the first and second attachment orientations. The handlebar post may be alternatively rotatable about a pivot axis generally parallel to the axle of one of the wheels between the first and second attachment orientations The carrier member may slide along the at least one handlebar post between the first and second attachment orientations. The carrier member may move together with the at least one handlebar post. The frame may be foldable to a compact orientation.

There is also provided in accordance with an embodiment of the present invention cycling apparatus including at least one front wheel and at least one rear wheel rotatably mounted on axles on a frame, a riding seat attached to the frame, a drive mechanism coupled to at least one of the wheels for driving the cycling apparatus, at least one handlebar post attached to a portion of the frame, and a carrier member attachable to the frame for carrying at least one of a child and an object therein, wherein the cycling apparatus has a rider-powered orientation drivable by a rider sitting on the seat and powering the drive mechanism, wherein the at least one handlebar post is in steering linkage with the at least one front wheel for steering thereof, and wherein the cycling apparatus has a stroller orientation wherein the at least one handlebar post is arranged with respect to the carrier member to form a pushable stroller and wherein the at least one handlebar post is not in steering linkage with the at least one front wheel for steering thereof.

BRIEF DESCRIPTION OF THE DRAWINGS

The present invention will be understood and appreciated more fully from the following detailed description taken in conjunction with the drawings in which:

FIGS. 1A and 1B are simplified side view illustrations of cycling apparatus, constructed and operative in accordance with an embodiment of the present invention, with at least one handlebar post moved in translatory motion from a first to a second attachment orientation;

FIGS. 2A and 2B are simplified side view illustrations of cycling apparatus, constructed and operative in accordance with another embodiment of the present invention, with at least one handlebar post moved in translatory motion from a first to a second attachment orientation by means of an adjustment assembly coupled to the handlebar post;

FIGS. 4A and 4B are simplified side view illustrations of cycling apparatus, constructed and operative in accordance with still another embodiment of the present invention, with at least one handlebar post rotated about a pivot between first and second attachment orientations and wherein the carrier member slides along the handlebar post between the first and second attachment orientations;

FIGS. 6A and 6B are simplified side view illustrations of cycling apparatus, constructed and operative in accordance with yet another embodiment of the present invention, with at least one handlebar post both rotated and translated between first and second attachment orientations;

FIG. 7B is a simplified side view illustration of the cycling apparatus of FIG. 7A in a stroller orientation, in accordance with an embodiment of the present invention, wherein the seat of the cycling apparatus is folded downwards and wherein the pushing direction of the stroller is opposite to the riding direction and the child seat now faces the pushing direction, and the handlebar post changes its angle;

FIG. 7D is a simplified side view illustration of the cycling apparatus of FIG. 7A in a stroller orientation, in accordance with an embodiment of the present invention, wherein the seat of the cycling apparatus has been removed and placed elsewhere on the cycling apparatus;

FIG. 7E is a simplified side view illustration of the cycling apparatus of FIG. 7A in the rider-powered orientation and with a carrier basket facing the forward, riding direction;

FIG. 8A is a simplified side view illustration of cycling apparatus, constructed and operative in accordance with another embodiment of the present invention, in a rider-powered orientation and child seat facing forward in the riding direction;

FIG. 9B is a simplified side view illustration of the cycling apparatus of FIG. 9A in a stroller orientation, in accordance with an embodiment of the present invention, wherein the frame of the cycling apparatus is shortened and wherein the pushing direction of the stroller is opposite to the riding direction and the child seat now faces the pushing direction, and wherein the handlebar with the child seat rotate about a vertical axis; and FIGS. 10A, 10B and 10C are simplified side view illustration of cycling apparatus, constructed and operative in accordance with any of the above embodiments of the present invention, in respective non-folded, semi-folded and fully folded positions.

DETAILED DESCRIPTION OF EMBODIMENTS

Figure 1A:
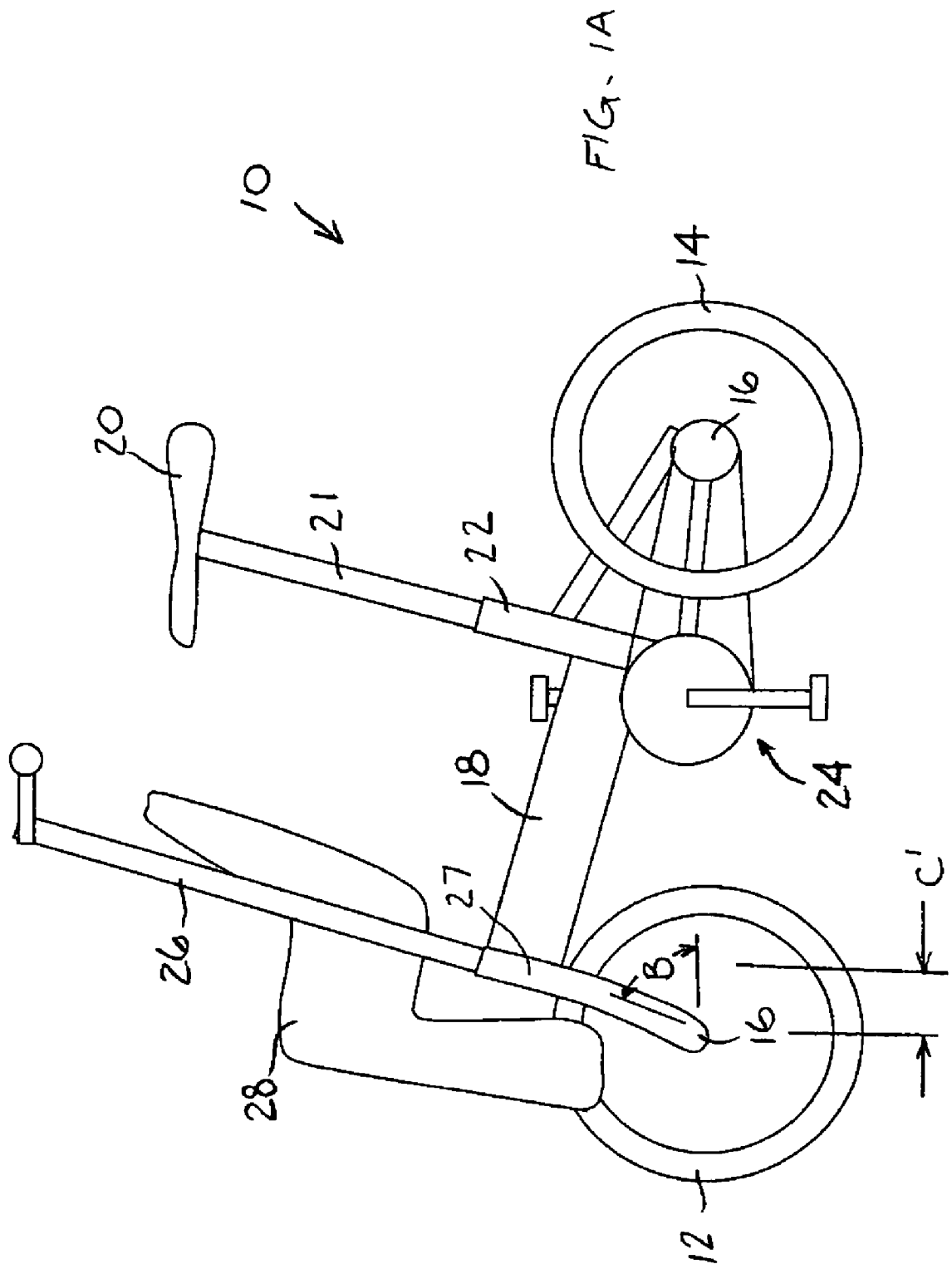

Reference is now made to FIGS. 1A and 1B, which illustrate cycling apparatus 10, constructed and operative in accordance with an embodiment of the present invention.

Cycling apparatus 10 in general may include one or more front wheels 12 and one or more rear wheels 14 rotatably mounted on axles 16 on a frame 18. For example, without limitation, cycling apparatus 10 may be configured as a tricycle with two front wheels 12 and one rear wheel 14, or alternatively, as a tricycle with one front wheel 12 and two rear wheels 14, or as another alternative, as a quadrocycle with two front wheels 12 and two rear wheels 14.

A riding seat 20 may be attached to frame 18, such as by means of a seat post 21 slidingly mounted in a tube 22, as is extremely well known in the art. A drive mechanism 24 is coupled to one or more of the wheels 12 or 14 for driving the cycling apparatus, such as a pedal, gear and chain drive extremely well known in the art.

One or more handlebar posts 26 may be attached to a portion of frame 18, which are movable between first and second attachment orientations, as will be described more in detail below. The handlebar post 26 may be journaled in a handlebar post tube, which in FIG. 1A is the front post tube 27, as is known in the art. A carrier member 28 may be attached to frame 18 (e.g., to handlebar post 26) for carrying a child and/or an object (e.g., carrier member 28 may be a child seat or a shopping container). As an example, there may be two handlebar posts 26 separated by a space, wherein at least a portion of the carrier member 28 is disposed in the space between the handlebar posts 26.

In the first attachment orientation, shown in FIG. 1A, there is a reference distance C' defined between the handlebar post 26 and the axle(s) 16 of the front wheel(s) 12. A reference angle B is defined about the axle 16 of the front wheel(s) 12 between a horizontal plane and the handlebar post 26 (or alternatively between the horizontal plane and the front post tube 27). The reference angle B about the front axle 16 may be in the range of 45°-90°, but is not at all limited to this range. In the second attachment orientation, shown in FIG. 1B, handlebar post(s) 26 has (have) been moved to another portion of the frame 18 (e.g., inserted in a sideways extension of tube 22). In this orientation, the reference distance between handlebar post 26 and axle 16 is different from the first attachment orientation, that is, it is no longer C' but some distance C".

Carrier member 28 has also been translated to the new position together with handlebar post(s) 26. That is, carrier member 28 has been moved from the first attachment orientation to the second attachment orientation. The distance between carrier member 28 and axle 16 is different between the first and second attachment orientations, too. Seat 20 has been lowered in tube 22 or has been moved to another portion of frame 18.

In the first attachment orientation, cycling apparatus 10 is in a rider-powered orientation drivable by a rider (not shown) sitting on seat 20 and powering the drive mechanism 24, just like a "regular" bicycle or tricycle. In the second attachment orientation, cycling apparatus 10 is in a stroller orientation wherein the handlebar post(s) 26 is (are) arranged with respect to carrier member 28 to form a pushable stroller.

The center of gravity of the carrier member 28 with respect to the axle 16 of the front wheel 12 at the first attachment orientation is different than at the second attachment orientation. For example, in the first attachment orientation, the center of gravity of the carrier member 28 is located over the front wheel 12, whereas in the second attachment orientation, the center of gravity of the carrier member 28 has been shifted rearward towards the rear wheels 14.

Moreover, the steering of the cycling apparatus 10 is different in the two orientations. In the first attachment orientation, that is, the rider-powered orientation, the handlebar post(s) 26 may be in steering linkage with the front wheel(s) 12 to steer them, as in a bicycle or tricycle. However, in the second attachment orientation, that is, the stroller orientation, the handlebar post(s) 26 are not in steering linkage with the front wheel 12. There are two rear wheels 14 and one front wheel 12 and, as in conventional strollers, the front wheel 12 either turns freely or may be constrained to roll in a straight line. Steering may be accomplished as with conventional strollers, namely, by shifting the weight on the rear wheels 14 and turning.

It is noted that seat post 21 extends further out of the tube 22 in the rider-powered orientation than in the stroller orientation.

Figure 2A:
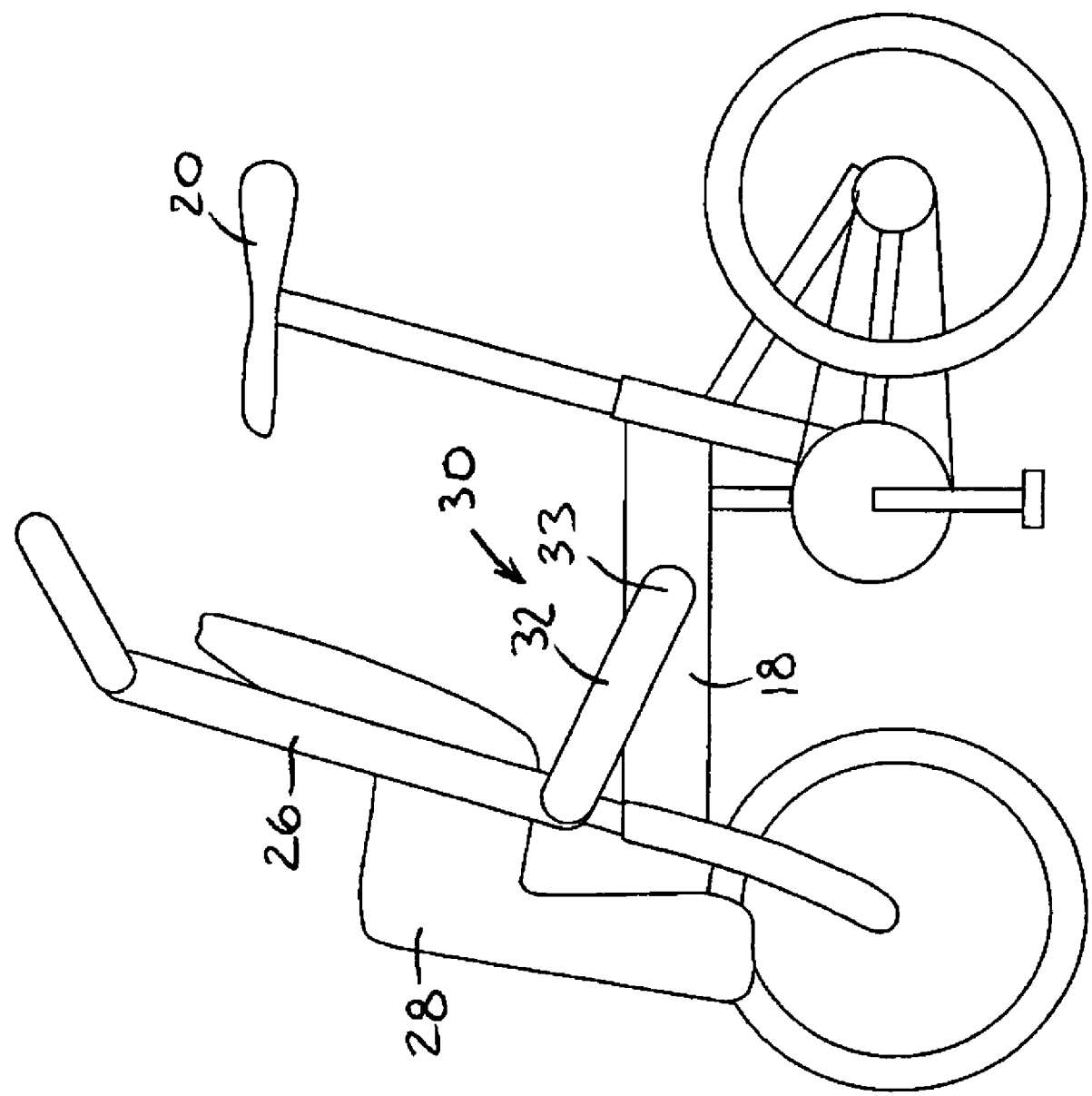

Reference is now made to FIGS. 2A and 2B, which illustrate an embodiment similar to the cycling apparatus of FIGS. 1A and 1B. In this embodiment, the handlebar post(s) 26 may be moved in translatory motion from the first to second attachment orientations by means of an adjustment assembly 30 coupled to the handlebar post(s) 26. The adjustment assembly 30 may include a link member 32 pivotally coupled to the handlebar post(s) 26 and pivotally attached to frame 18 that may be pivoted about pivot 33 to move between the first and second attachment orientations. The adjustment assembly 30 may be locked into place at each of the attachment orientations, such as by "clicking" into detents as is well known in the art. Here, too, carrier member 28 has been translated to the new position together with handlebar post(s) 26, and seat 20 has been lowered in tube 22 or has been moved to another portion of frame 18.

Figure 3A:
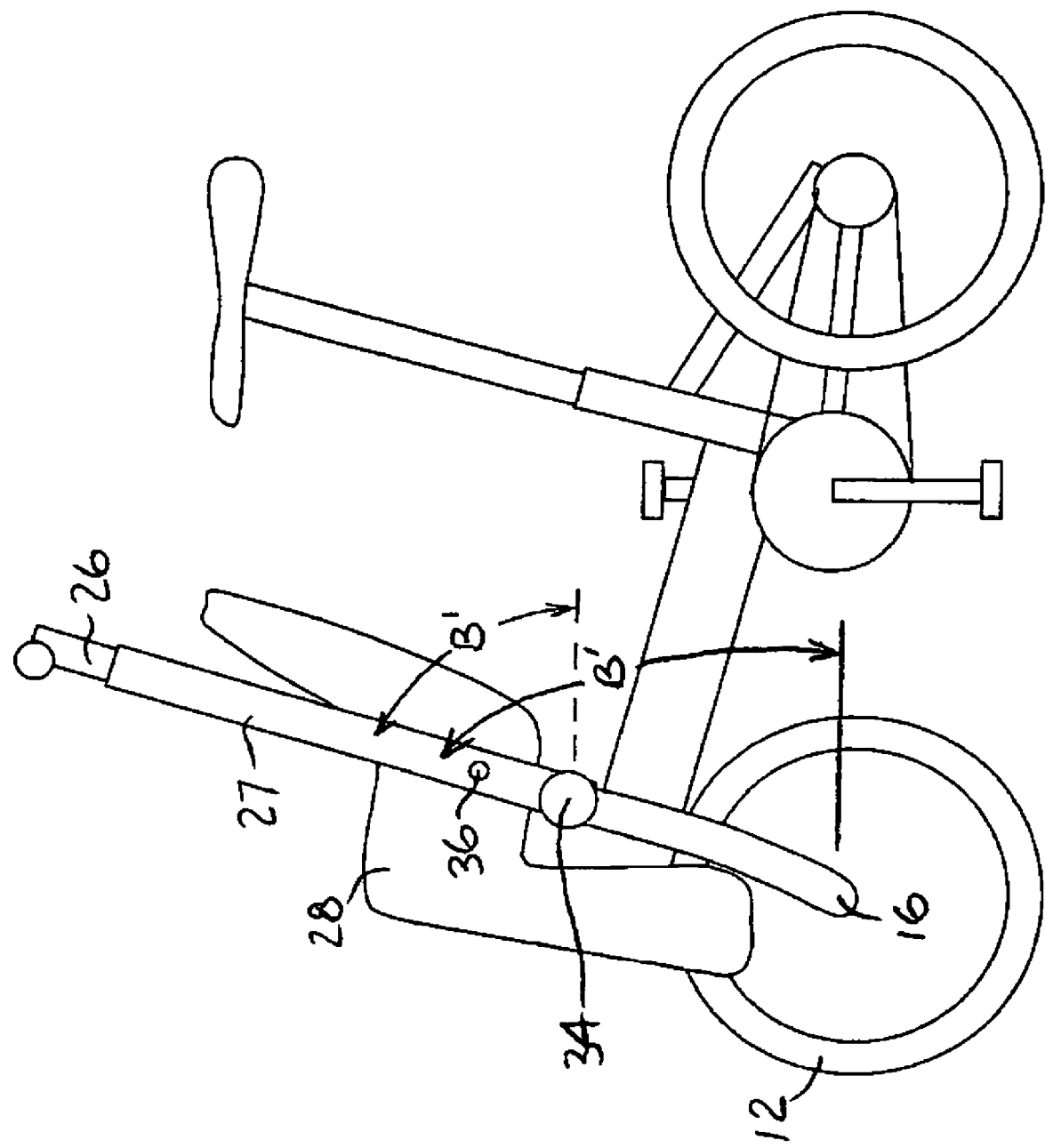
FIGS. 3A and 3B are simplified side view illustrations of cycling apparatus, constructed and operative in accordance with yet another embodiment of the present invention, with at least one handlebar post rotated about a pivot between first and second attachment orientations and telescopically extended.
Figure 3B:
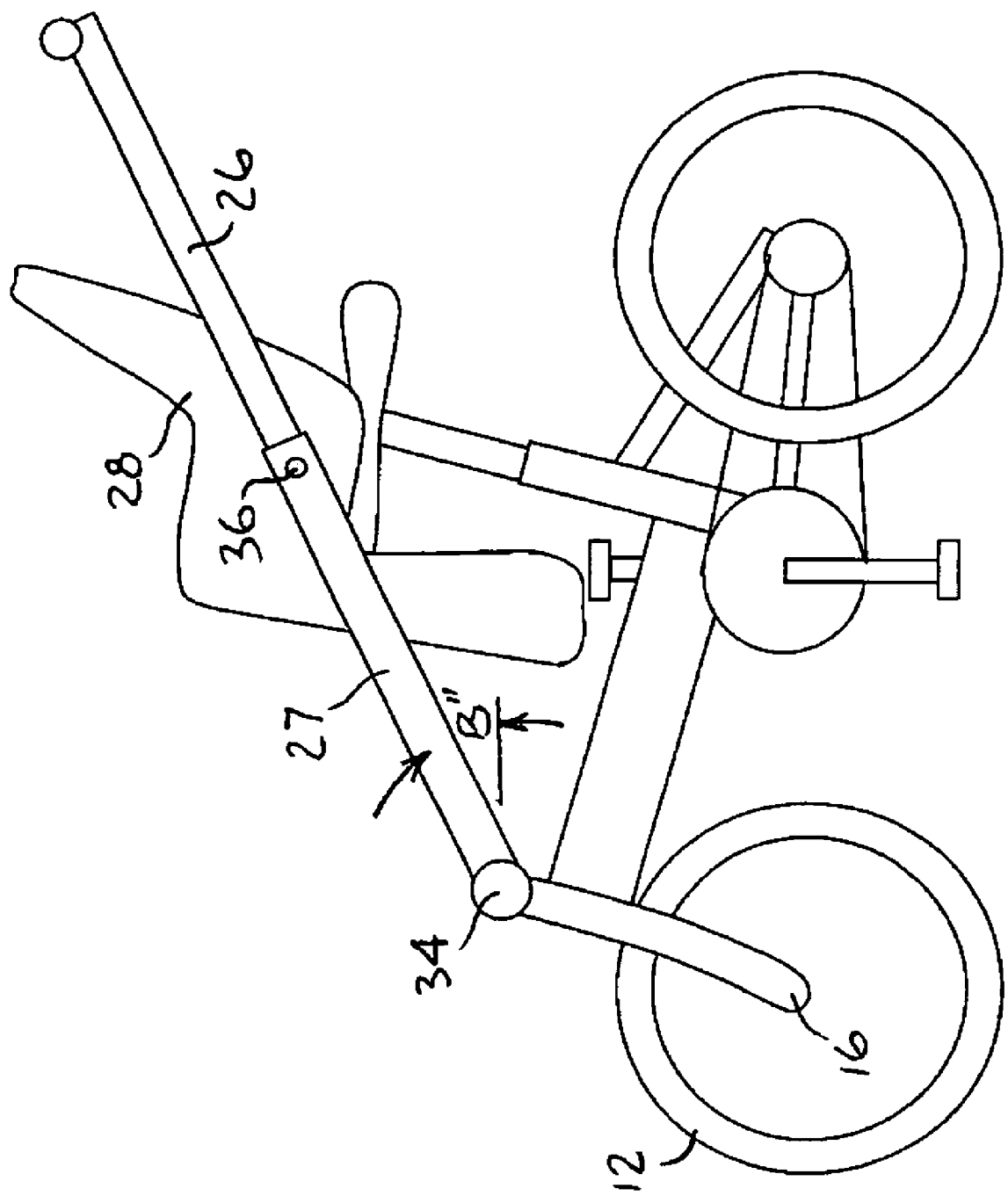

Reference is now made to FIGS. 3A and 3B, which illustrate an embodiment similar to the cycling apparatus of FIGS. 1A and 1B. In this embodiment, a portion of the handlebar post(s) 26 may be rotated about a pivot 34 to move between the first and second attachment orientations. The handlebar post 26 is telescopically extendable. In this embodiment, a reference angle B' is defined between the horizontal and the handle bar tube 27 about pivot 34 (or alternatively, about the front axle 16). The reference angle B' may be in the range of 45°-90° (e.g., 72°-78°), but is not at all limited to this range. In the second attachment orientation, shown in FIG. 3B, the reference angle B' has changed to a reference angle B", which may be in the range of 5°-70°, but is not at all limited to this range. The handlebar post 26 is rotatable about the pivot axis of pivot 34 generally parallel to the rotational axis of the front axle 16, when moving between the first and second attachment orientations. Thus the handlebar post 26 changes its rotational orientation about the axle 16 between the first and second attachment orientations.

In the second attachment orientation, that is, the stroller orientation, pivot 34 may be locked in place (e.g., by means of a pawl and detent, not shown) so that the handlebar post(s) 26 are not in steering linkage with the front wheel 12. Instead, the front wheel 12 either turns freely or may be constrained to roll in a straight line (as in the previous embodiments). Once again, there are two rear wheels 14 and one front wheel 12 and the cycling apparatus is steered as in conventional strollers.

Carrier member 28 slides along the post 27 between the first and second attachment orientations, such as by means of a glide element 36 that slides on post 27 or on a track formed in post 27.

Reference is now made to FIGS. 4A and 4B, which illustrate another embodiment similar to the cycling apparatus of FIGS. 3A and 3B. In this embodiment, handlebar post 26 may be one and the same as post 27, because handle bars 38 extend from carrier member 28 instead of the post. There is no need for handlebar post 26 to telescopically extend from post 27. Handlebar post 26 rotates about pivot 34 between the first and second attachment orientations, and once again, carrier member 28 slides along the handlebar post 26 between the first and second attachment orientations, such as by means of a glide element 36 that slides on handlebar post 26 or on a track formed in the post 26.

Figure 5A:
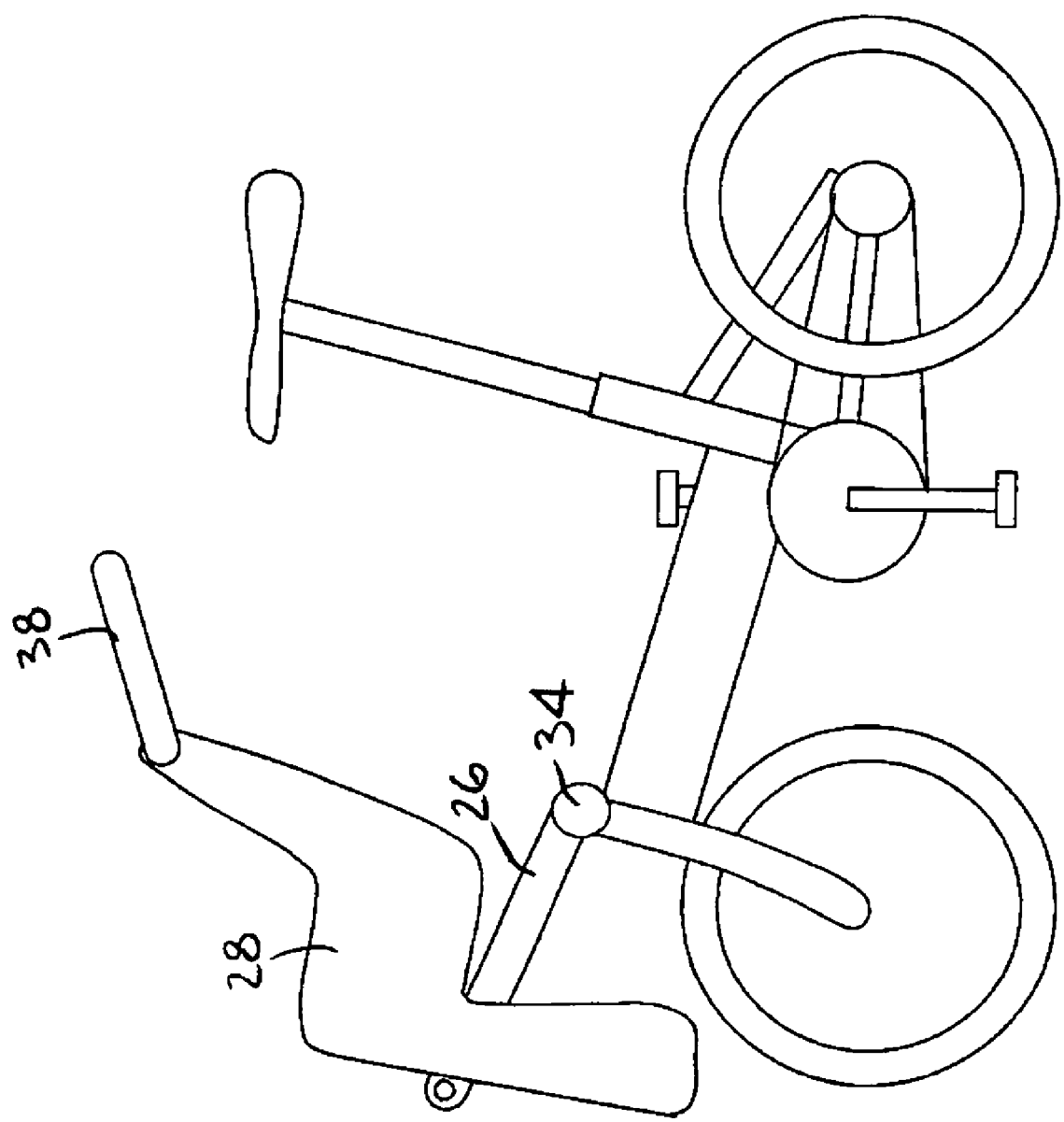
FIGS. 5A and 5B are simplified side view illustrations of cycling apparatus, constructed and operative in accordance with another embodiment of the present invention, with at least one handlebar post rotated about a pivot between first and second attachment orientations.
Figure 5B:
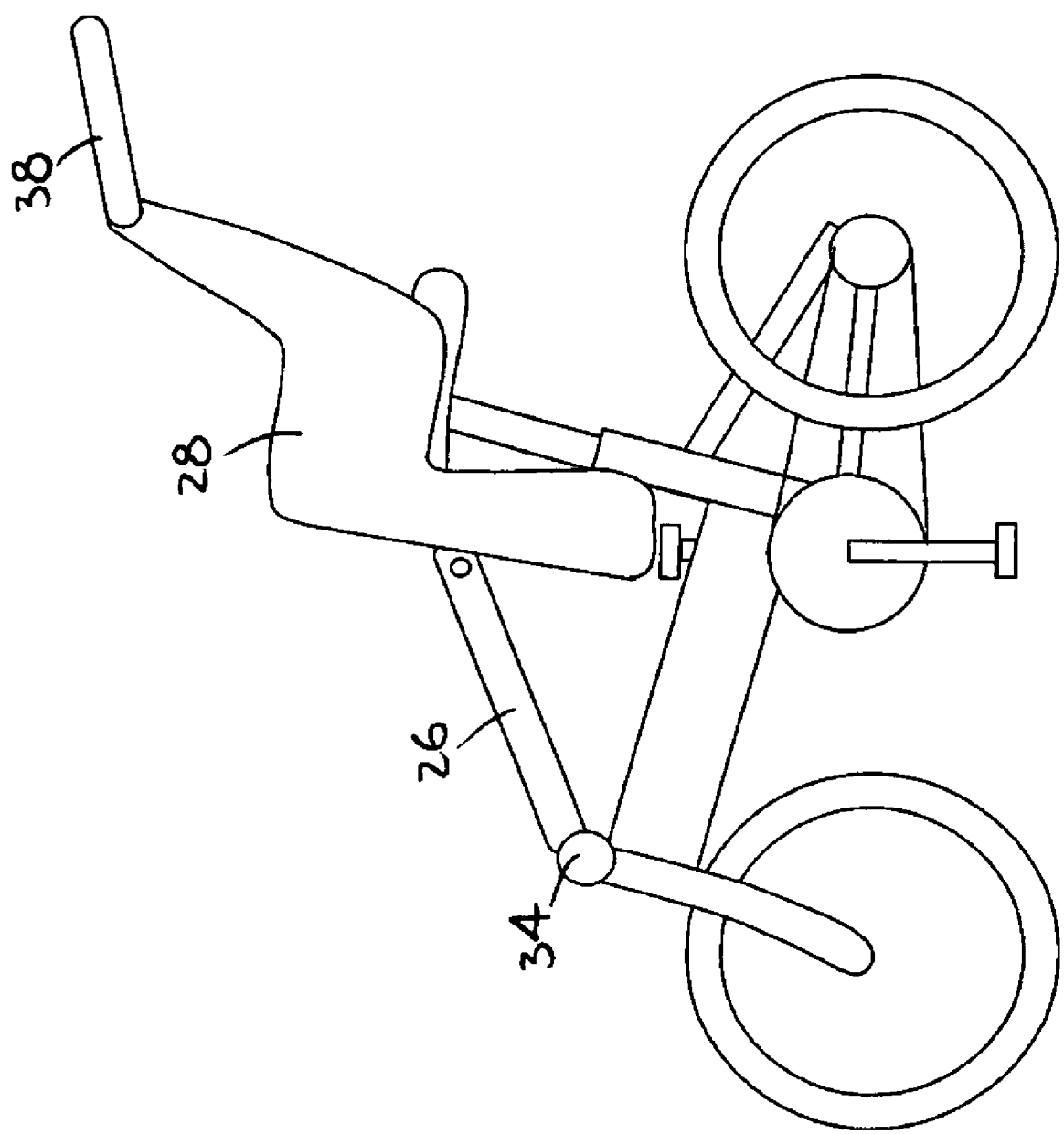

Reference is now made to FIGS. 5A and 5B, which illustrate another embodiment similar to the cycling apparatus of FIGS. 3A and 3B. In this embodiment, carrier member 28 is mounted on handlebar post(s) 26 and handle bars 38 extend from carrier member 28 (instead of the handle bar(s) 26). As previously described, handlebar post(s) 26 may be rotated about pivot 34 between the first and second attachment orientations Reference is now made to FIGS. 6A and 6B, which illustrate another embodiment of the invention. In this embodiment, handlebar post(s) 26 may be both rotated and translated between the first and second attachment orientations by means of an adjustment assembly 40 coupled to the handlebar post(s) 26. The adjustment assembly 40 may include a bar member 42 pivotally coupled to the handlebar post(s) 26 at a pivot 44 and pivotally attached to frame 18 at a pivot 46. The adjustment assembly 40 may be pivoted about pivots 44 and 46 to move between the first and second attachment orientations. The adjustment assembly 40 may be locked into place at each of the attachment orientations, such as by "clicking" into detents as is well known in the art. Again, carrier member 28 has been translated to the new position together with handlebar post(s) 26, and seat 20 has been pivoted about pivot 46 to move out of the way in the second attachment orientation. Handle bars 48 may pivotally extend from carrier member 28. In the embodiment of FIGS. 6A and 6B, the handlebar post 26 spatially translates and also changes its rotational orientation about the axle 16 between the first and second attachment orientations.

Figure 7A:
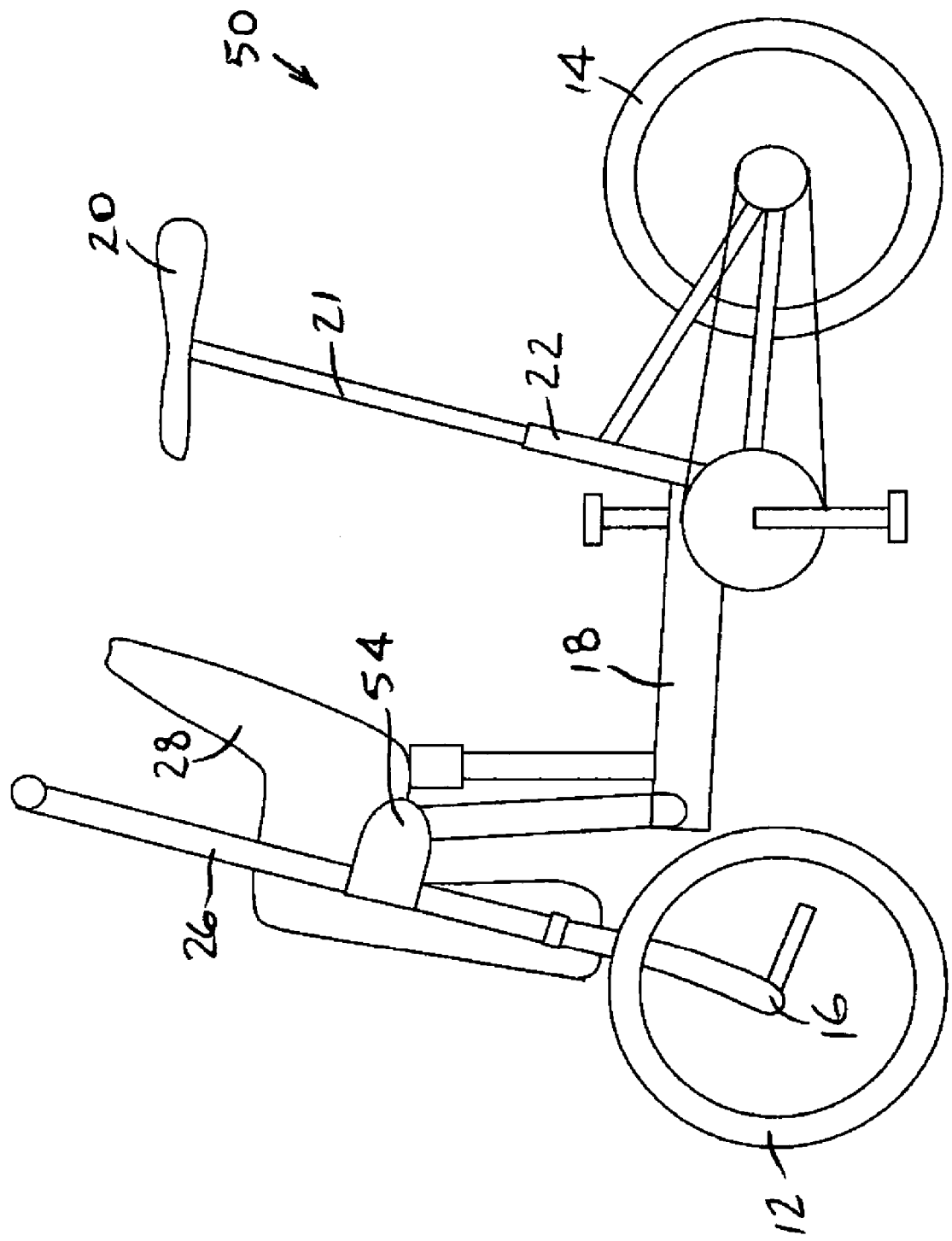
FIG. 7A is a simplified side view illustration of cycling apparatus, constructed and operative in accordance with an embodiment of the present invention, in a rider-powered orientation and child seat facing forward in the riding direction.

Reference is now made to FIGS. 7A-7D, which illustrate cycling apparatus 50, constructed and operative in accordance with an embodiment of the present invention. Cycling apparatus 50 is shown in FIG. 7A in a rider-powered orientation with carrier member 28 (child seat) facing forward in the riding direction.

In this embodiment, handlebar post(s) 26 may be rotated about front axle 16 and may be locked into place at each of the attachment orientations, such as by "clicking" into detents as is well known in the art. In the first attachment orientation (FIG. 7A), the handlebars 26 are tilted away from an upright position toward the seat 20. In the second attachment orientation (FIG. 7B) the handlebars 26 are tilted away from the upright position and away from the seat 20 (at a different angular orientation with respect to the front axle 16). Handlebar post 26 may be pivoted about a pivot member 54 attached to frame 18. In FIG. 7B, which illustrates the stroller orientation, seat 20 is folded downwards. The pushing direction of the stroller is opposite to the riding direction. Carrier member 28 (child seat) has changed its center of gravity with respect to axle 16 and now faces the pushing direction.

Figure 7C:
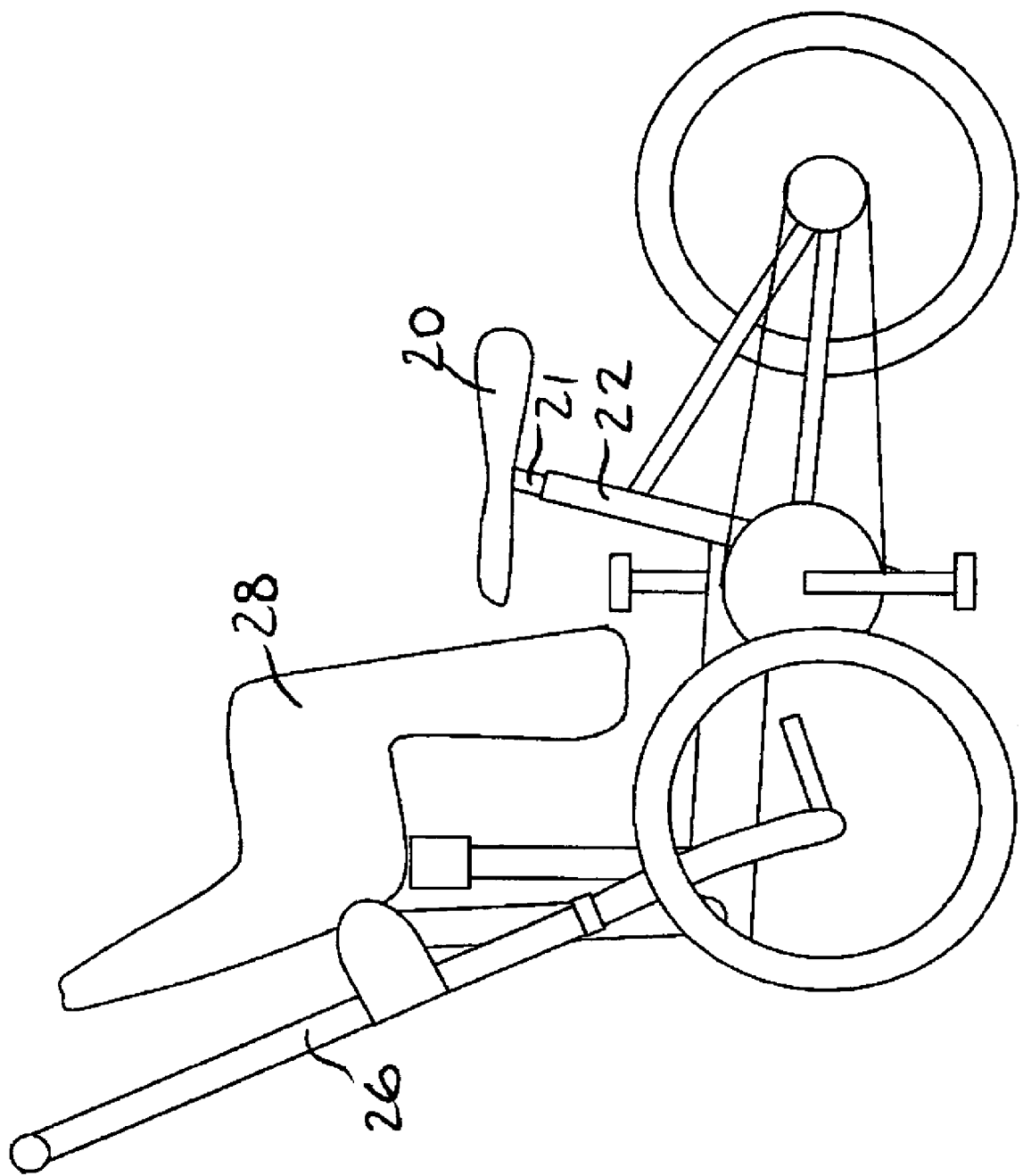
FIG. 7C is a simplified side view illustration of the cycling apparatus of FIG. 7A in a stroller orientation, in accordance with an embodiment of the present invention, wherein the seat of the cycling apparatus is moved downwards in support tube.

Alternatively, as shown in FIG. 7C, the seat 20 may be moved downwards in support tube 22. Another alternative is shown in FIG. 7D. Here seat 22 has been removed and placed elsewhere on the frame 18.

Figure 7F:
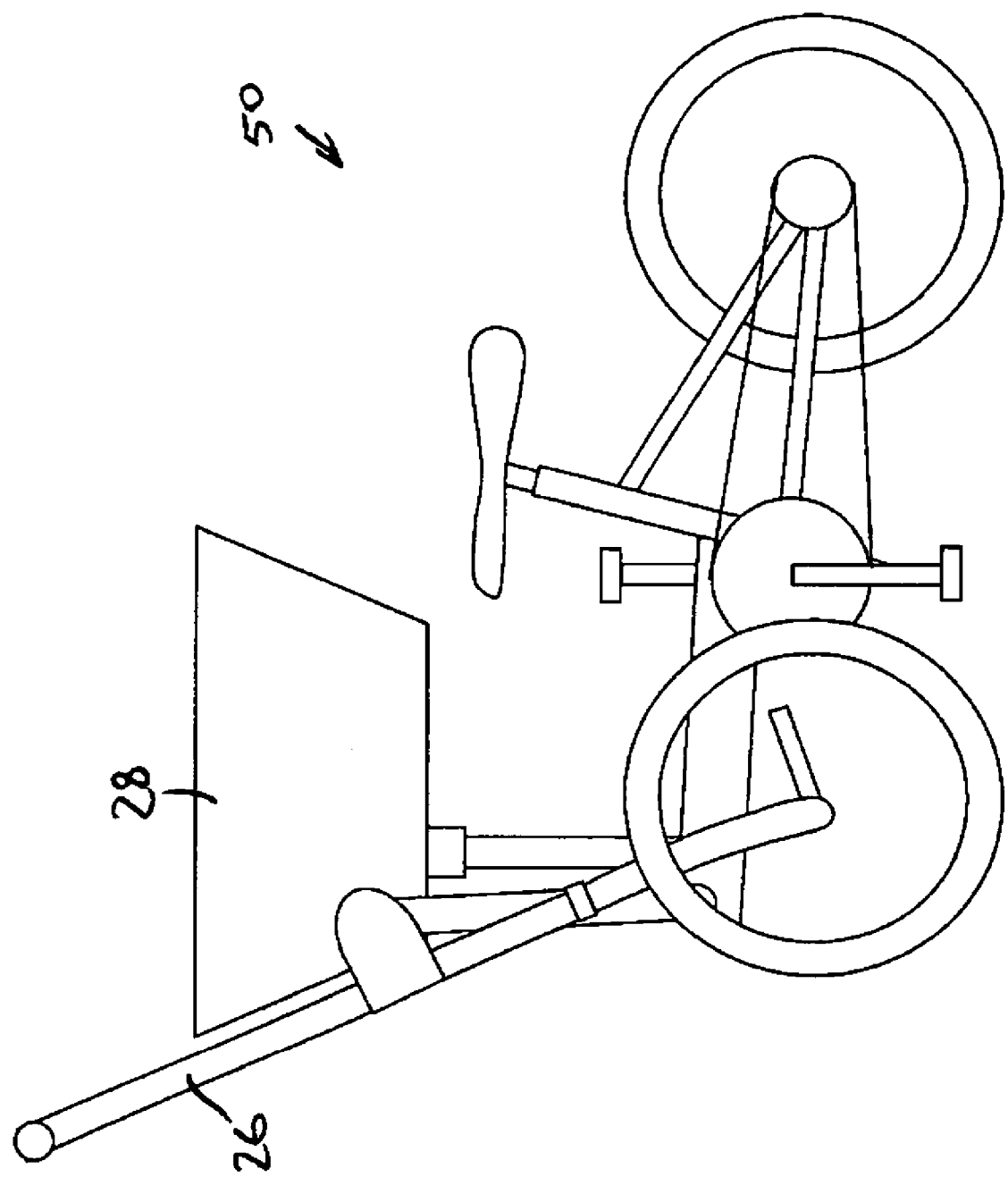
FIG. 7F is a simplified side view illustration of the cycling apparatus of FIG. 7A in a stroller orientation, wherein the carrier basket now faces the pushing direction.

FIGS. 7E and 7F show the cycling apparatus 50 respectively in the rider-powered and stroller orientations, this time with the carrier member 28 being a carrier basket.

It is noted that by pivoting handlebar posts(s) 26 about the front axle 26, the distance between the front and rear wheels 12 and 14 changes between the first and second attachment orientations. It is also noted that carrier member 28 faces in a first direction when the cycling apparatus 50 is in the rider-powered orientation, and faces in a second direction opposite to the first direction when the cycling apparatus 50 is in the stroller orientation.

Figure 8B:
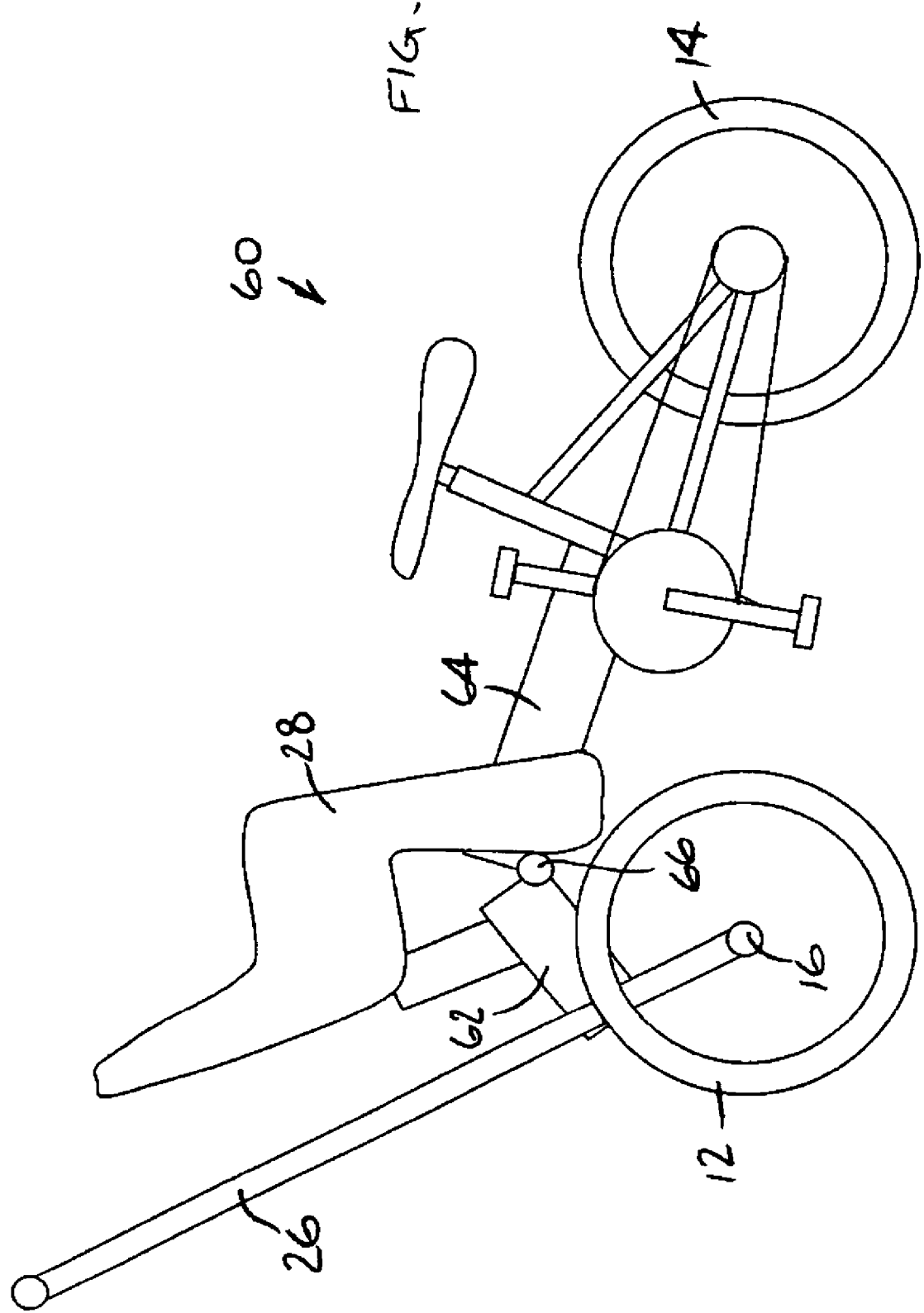
FIG. 8B is a simplified side view illustration of the cycling apparatus of FIG. 8A in a stroller orientation, in accordance with an embodiment of the present invention, wherein the frame of the cycling apparatus is folded and wherein the pushing direction of the stroller is opposite to the riding direction and the child seat now faces the pushing direction.

Reference is now made to FIGS. 8A and 8B, which illustrate cycling apparatus 60, constructed and operative in accordance with another embodiment of the present invention. In this embodiment, the frame of cycling apparatus 60 includes a first portion 62 and a second portion 64 that are pivoted to one another at a pivot 66. The action of pivoting handlebar post(s) 26 about front axle 16 and first portion 62 pivoting about pivot 66 moves cycling apparatus 60 between the first and second attachment orientations. Here again the distance between the front and rear wheels 12 and 14 changes between the first and second attachment orientations.

Figure 9A:
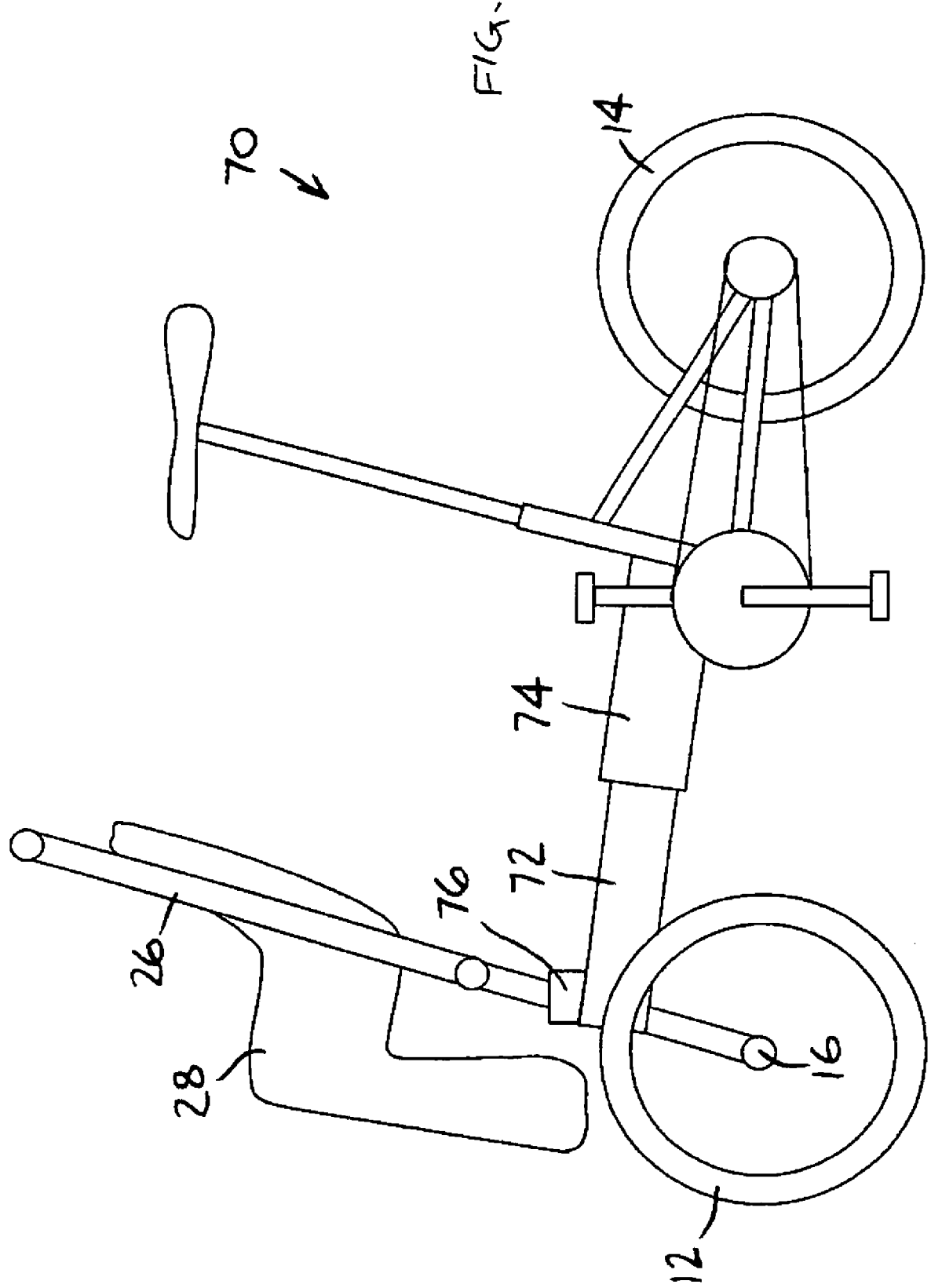
FIG. 9A is a simplified side view illustration of cycling apparatus, constructed and operative in accordance with yet another embodiment of the present invention, in a rider-powered orientation and child seat facing forward in the riding direction.

Reference is now made to FIGS. 9A and 9B, which illustrate cycling apparatus 70, constructed and operative in accordance with another embodiment of the present invention. In this embodiment, the frame of cycling apparatus 70 includes a first portion 72 that telescopically extends in and out of a second portion 74. The handlebar post(s) 26 may be pivoted about a pivot 76 in order to rotate the handlebar post(s) 26 together with carrier member 28 and thereby change the angle of the handlebar post(s) 26 with respect to the vertical and change the direction of carrier member 28. In this manner, cycling apparatus 70 may be moved between the first and second attachment orientations. Additionally, first portion 72 may be separately moved telescopically in and out of second portion 74 to change the wheel base, i.e., the distance between the front and rear wheels 12 and 14. Alternatively, the action of pivoting handlebar post(s) 26 about a pivot 76 may move first portion 72 telescopically in and out of second portion 74, and move cycling apparatus 70 between the first and second attachment orientations. The distance between the front and rear wheels 12 and 14 changes between the first and second attachment orientations, and the child seat changes its center of gravity.

Reference is now made to FIGS. 10A-10C. Any of the above embodiments of the present invention may be constructed of dual front frame members 80 pivoted to the rest of the frame at pivots 82. This permits folding the cycling apparatus from a non-folded position (FIG. 10A) to a semi-folded position (FIG. 10B) and a fully folded position (FIG. 10C).

It is appreciated that various features of the invention which are, for clarity, described in the contexts of separate embodiments, may also be provided in combination in a single embodiment. Conversely, various features of the invention which, for brevity, are described in the context of a single embodiment, may also be provided separately or in any suitable subcombination.

What is claimed is:

1. Cycling apparatus comprising:
   at least one front wheel and at least one rear wheel rotably mounted on axels on a frame;
   a riding seat attached to said frame;
   a drive mechanism coupled to at least one of the wheels for driving the cycling apparatus;
   at least one handlebar post attached to portion of said frame; and
   a carrier member attachable to said frame for carrying at least one child and an object therein and movable between first and second attachment orientations, wherein in the first attachment orientation said cycling apparatus is in a rider-powered orientation drivable by a rider sitting on said seat and powering said drive mechanism, and wherein in the second attachment orientation said cycling apparatus is in a stroller orientation wherein said at least one handlebar post is arranged with respect to said carrier member to form a pushable stroller, wherein in the stroller orientation there are two rear wheels, wherein the at least one rear wheel in the rider orientation is arranged for movement about a portion of said frame to become the at least one front wheel in the stroller orientation.

2. The cycling apparatus according to claim 1, wherein a center of gravity of said carrier member with respect to the axle of said at least one front wheel at the first attachment orientation is different than at the second attachment orientation.

3. The cycling apparatus according to claim 1, wherein said at least one handlebar post comprises two individual mounting posts separated by a space, wherein at least a portion of said carrier member is disposed in the space between said mounting posts.

4. The cycling apparatus according to claim 1, wherein said frame is foldable to a compact orientation.

5. Cycling apparatus comprising:
   at least one front wheel and at least one rear wheel rotably mounted on axels on a frame;
   a riding seat attached to said frame;
   a drive mechanism coupled to at least one of the wheels for driving the cycling apparatus;
   at least one handlebar post attached to a portion of said frame; and
   a carrier member attached to said frame for carrying at least one of a child and an object therein and movable between first and second attachment orientations, wherein in the first attachment orientation said cycling apparatus is in a rider-powered orientation drivable by a rider sitting on said seat and powering said drive mechanism, and wherein in the second attachment orientation said cycling apparatus is in a stroller orientation wherein said at least one handler post is arranged with respect to said carrier member to form a pushable stroller, wherein in the stroller orientation there are two rear wheels, wherein the at least one rear wheel pivots about a pivot in said frame when moving from the rider orientation to the stroller orientation.

6. The cycling apparatus according to claim 5, wherein a center of gravity of said carrier member with respect to the axle of said at least one front wheel at the first attachment orientation is different than at the second attachment orientation.

7. The cycling apparatus according to claim 5, wherein said at least one handlebar post comprises two individual mounting posts separated by a space, wherein at least a portion of said carrier member is disposed in the space between said mounting posts.

8. The cycling apparatus according to claim 5, wherein said frame is foldable to a compact orientation.

9. Cycling apparatus comprising:
at least one front wheel and at least one rear wheel rotably mounted on axels on a frame;
a riding seat attached to said frame;
a drive mechanism coupled to at least one of the wheels for driving the cycling apparatus;
at least one handlebar post attached to a portion of said frame; and
a carrier member attached to said frame for carrying at least one of a child and an object therein and movable between first and second attachment orientations, wherein in the first attachment orientation said cycling apparatus is in a rider-powered orientation drivable by a rider sitting on said seat and powering said drive mechanism, and wherein in the second attachment orientation said cycling apparatus is in a stroller orientation wherein said at least one handler post is arranged with respect to said carrier member to form a pushable stroller, wherein in the stroller orientation there are two rear wheels, wherein said carrier member faces in a first direction when said cycling apparatus is in the rider orientation, and faces in a second direction opposite to the first direction when said cycling apparatus is in the stroller orientation.

10. The cycling apparatus according to claim 9, wherein a center of gravity of said carrier member with respect to the axle of said at least one front wheel at the first attachment orientation is different than at the second attachment orientation.

11. The cycling apparatus according to claim 9, wherein said at least one handlebar post comprises two individual mounting posts separated by a space, wherein at least a portion of said carrier member is disposed in the space between said mounting posts.

12. The cycling apparatus according to claim 9, wherein said frame is foldable to a compact orientation.

\* \* \* \* \*